US011627257B2

(12) United States Patent
Kim et al.

(10) Patent No.: US 11,627,257 B2
(45) Date of Patent: Apr. 11, 2023

(54) ELECTRONIC DEVICE INCLUDING IMAGE SENSOR HAVING MULTI-CROP FUNCTION

(71) Applicant: Samsung Electronics Co., Ltd., Suwon-si (KR)

(72) Inventors: Sungjun Kim, Hwaseong-si (KR); Kwangjin An, Suwon-si (KR); Jonha Lee, Seoul (KR); Su-Young Lee, Daejeon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/493,185

(22) Filed: Oct. 4, 2021

(65) Prior Publication Data

US 2022/0166936 A1 May 26, 2022

(30) Foreign Application Priority Data

Nov. 26, 2020 (KR) ........................ 10-2020-0161348

(51) Int. Cl.
*H04N 5/232* (2006.01)
*H04N 5/225* (2006.01)
*H04N 5/347* (2011.01)

(52) U.S. Cl.
CPC ..... *H04N 5/232945* (2018.08); *H04N 5/2258* (2013.01); *H04N 5/232933* (2018.08); *H04N 5/347* (2013.01)

(58) Field of Classification Search
None
See application file for complete search history.

(56) References Cited

U.S. PATENT DOCUMENTS

| 9,258,485 B2 | 2/2016 | Wang et al. |
| 10,412,298 B2 | 9/2019 | Li |
| 2011/0058053 A1* | 3/2011 | Roh ........................ H04N 5/232 348/222.1 |
| 2011/0242342 A1 | 10/2011 | Goma et al. |

(Continued)

FOREIGN PATENT DOCUMENTS

| KR | 100796340 B1 | 1/2008 |
| KR | 101512222 B1 | 4/2015 |

(Continued)

*Primary Examiner* — Twyler L Haskins
*Assistant Examiner* — Dwight Alex C Tejano
(74) *Attorney, Agent, or Firm* — Harness, Dickey & Pierce, P.L.C.

(57) ABSTRACT

An electronic device includes first and second image sensors, an image signal processor, and a main processor. The first and second image sensors photograph an object in first and second FOVs to generate first and second signals, respectively. The image signal processor generates first image data based on the first signal, generates second image data based on the second signal, and generates cropped image data based on cropping ROI from the second image data. The main processor generates a first video stream based on the first image data, generates a second video stream based on the cropped image data, and outputs the first video stream to a display device. The main processor stops outputting the first video stream to the display device and initiates outputting the second video stream to the display device in response to receiving a user input command.

20 Claims, 20 Drawing Sheets

(56) References Cited

U.S. PATENT DOCUMENTS

| | | | |
|---|---|---|---|
| 2015/0085174 A1* | 3/2015 | Shabtay | G06T 7/33 |
| | | | 348/336 |
| 2015/0189198 A1* | 7/2015 | Park | H04N 5/347 |
| | | | 348/302 |
| 2016/0188635 A1 | 6/2016 | Shah et al. | |
| 2017/0041553 A1* | 2/2017 | Cao | H04N 5/265 |
| 2017/0085764 A1* | 3/2017 | Kim | H04N 5/2258 |
| 2017/0358061 A1 | 12/2017 | Choi et al. | |
| 2018/0013955 A1* | 1/2018 | Kim | H04N 5/232411 |
| 2018/0070023 A1* | 3/2018 | Oh | G06T 5/50 |
| 2018/0096487 A1* | 4/2018 | Nash | H04N 5/2621 |
| 2018/0152624 A1* | 5/2018 | Li | H04N 5/265 |
| 2019/0082101 A1* | 3/2019 | Baldwin | H04N 5/23293 |
| 2019/0098180 A1* | 3/2019 | Tachi | H04N 5/247 |
| 2019/0166313 A1* | 5/2019 | Furutake | H04N 5/04 |
| 2020/0019213 A1 | 1/2020 | Lee | |
| 2020/0077026 A1 | 3/2020 | Jeong et al. | |
| 2020/0099856 A1 | 3/2020 | Yun et al. | |
| 2020/0099866 A1 | 3/2020 | Dwarakanath et al. | |
| 2020/0103726 A1 | 4/2020 | Shabtay et al. | |
| 2020/0275021 A1* | 8/2020 | Weng | H04N 5/332 |
| 2020/0304704 A1 | 9/2020 | Lee et al. | |

FOREIGN PATENT DOCUMENTS

| | | |
|---|---|---|
| KR | 101759453 B1 | 7/2017 |
| KR | 101795271 B1 | 11/2017 |
| KR | 101928716 B1 | 12/2018 |
| KR | 101954926 B1 | 3/2019 |
| KR | 101975472 B1 | 5/2019 |
| KR | 2019-0101706 A | 9/2019 |

\* cited by examiner

ELECTRONIC DEVICE INCLUDING IMAGE SENSOR HAVING MULTI-CROP FUNCTION

CROSS-REFERENCE TO RELATED APPLICATION

This application claims priority under 35 U.S.C. § 119 to Korean Patent Application No. 10-2020-0161348 filed on Nov. 26, 2020, in the Korean Intellectual Property Office, the disclosures of which are incorporated by reference herein in their entireties.

BACKGROUND

Example embodiments of the inventive concepts described herein relate to electronic devices, and more particularly, relate to electronic devices for implementing a scanning zoom by using image sensors having a multi-crop function.

An image sensor is classified as a charge coupled device (CCD) image sensor, a complementary metal-oxide semiconductor (CMOS) image sensor (CIS), etc. The CMOS image sensor includes pixels including CMOS transistors and converts light energy to an electrical signal by using a photoelectric conversion element included in each pixel. The CMOS image sensor obtains information about a captured/photographed image by using the electrical signal generated by each pixel.

Nowadays, a sharp increase in the number of pixels of an image sensor makes it possible to provide an ultra-high definition (UHD) image to a user. However, due to the limitation on a bandwidth of an interface through which image data output from an image sensor are transmitted, it is impossible to obtain UHD image data every frame and then to provide a video in real time.

SUMMARY

Example embodiments of the inventive concepts provide a method of providing an ultra-high definition video stream to a user in real time within a limited bandwidth by using an image sensor having a multi-crop function, which may efficiently provide a UHD image associated with a specific object, which a user wants, to the user within a limited bandwidth.

According to some example embodiments, an electronic device may include a first image sensor that is configured to photograph an object in a first field of view to generate a first signal, a second image sensor that is configured to photograph the object in a second field of view to generate a second signal, an image signal processor that is configured to generate first image data of a current frame based on the first signal, generate second image data of the current frame based on the second signal, and generate cropped image data based on cropping a region of interest from the second image data, and a main processor that is configured to generate a first video stream based on the first image data, generate a second video stream based on the cropped image data, and output the first video stream to a display device. The main processor may be further configured to stop outputting the first video stream to the display device and initiate outputting the second video stream to the display device in response to receiving a user input command.

According to some example embodiments, an electronic device may include an image sensor, an image signal processor, and a main processor. The image sensor may be configured to photograph an object in a first field of view to generate a first signal. The image signal processor may be configured to generate first image data of a current frame based on the first signal, generate second image data of the current frame based on performing binning on the first image data, and generate cropped image data based on cropping a region of interest from the first image data. The main processor may be configured to generate a first video stream based on the second image data, generate a second video stream based on the cropped image data, and output the first video stream to a display device. The main processor may be configured to stop outputting the first video stream to the display device and initiate outputting the second video stream to the display device in response to receipt of a user input command.

According to some example embodiments, an electronic device may include a first image sensor, a second image sensor, an image signal processor, and a main processor. The first image sensor may be configured to photograph an object in a first field of view to generate a first signal. The second image sensor may be configured to photograph the object in a second field of view to generate a second signal. The image signal processor may be configured to generate first image data of a current frame based on the first signal, generate second image data of the current frame based on the second signal, generate third image data based on performing binning on the first image data, generate fourth image data based on performing binning on the second image data, generate first cropped image data based on cropping a first region of interest from the first image data, and generate second cropped image data based on cropping a second region of interest from the second image data. The main processor may be configured to generate a first video stream based on the first image data and the second image data, generate a second video stream based on the first cropped image data, generate a third video stream based on the second cropped image data, and output the first video stream to a display device. The main processor may be configured to stop outputting the first video stream to the display device and initiate outputting one of the second video stream or the third video stream to the display device in response to receiving a user input command.

BRIEF DESCRIPTION OF THE DRAWINGS

The above and other objects and features of the inventive concepts will become apparent by describing in detail some example embodiments thereof with reference to the accompanying drawings.

DETAILED DESCRIPTION

Below, some example embodiments of the inventive concepts may be described in detail and clearly to such an extent that one skilled in the art easily implements the inventive concepts.

Components that are described in the detailed description with reference to the terms "unit", "module", "block", "~er or ~or", etc. and function blocks illustrated in drawings will be implemented with software, hardware, and/or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, and/or a combination thereof.

Figure 1:
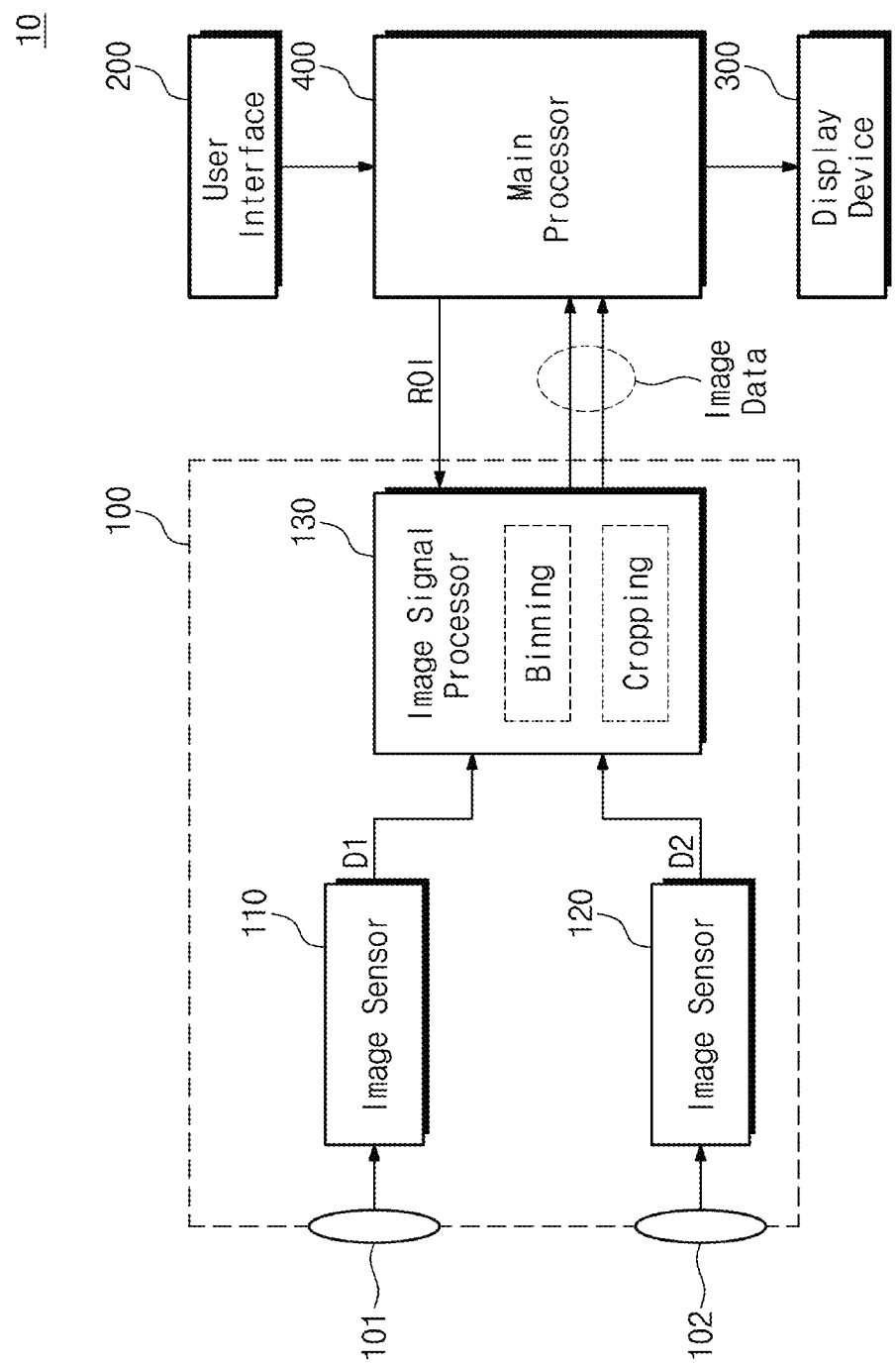
FIG. 1 illustrates a configuration of an electronic device including an image signal processor according to some example embodiments of the inventive concepts.

FIG. 1 illustrates a configuration of an electronic device including an image signal processor according to some example embodiments of the inventive concepts. An electronic device 10 may include an image processing block 100, a user interface 200, a display device 300, and a main processor 400, and the image processing block 100 may include lenses 101 and 102, image sensors 110 and 120, and an image signal processor 130.

The lenses 101 and 102 may receive a light reflected by an object (including a background, a scenery, etc.). The lenses 101 and 102 may have the same field of view (FOV) or may have different FOVs from each other. For example, the image processing block 100 is illustrated as including two lenses and two image sensors, but the number of lenses and the number of image sensors are not be limited thereto.

The image sensors 110 and 120, referred to herein as first and second image sensors, respectively, may respectively generate signals D1 and D2 based on the light received through the lenses 101 and 102. Each of the image sensors 110 and 120 may include a pixel array including pixels capable of converting a light to an electrical signal. For example, the image sensors 110 and 120 may include a complementary metal-oxide semiconductor (CMOS) sensor, a charge coupled device (CCD) sensor, etc. The image sensors 110 and 120 may respectively output the signals D1 and D2 by performing correlated-double sampling (CDS) on signals output from the corresponding pixel sensor arrays.

The image sensors 110 and 120 may have similar or different functions, similar or different performances, and/or similar or different characteristics. For example, the image sensors 110 and 120 may respectively output the signals associated with images of the same resolution or may respectively output the signals D1 and D2 associated with images of different resolutions.

The image signal processor 130 may appropriately process the signals D1 and D2 output from the image sensors 110 and 120 to generate image data of each video frame. In some example embodiments, the image signal processor 130 may generate image data based on the first signal D1 and may perform binning and/or cropping on the generated image data. The image signal processor 130 may generate image data based on the second signal D2 and may perform binning and/or cropping on the generated image data.

In some example embodiments, the image signal processor 130 may generate image data of a relatively low resolution based on one of the first signal D1 or the second signal D2. The image signal processor 130 may transmit the low-resolution image data to the main processor 400. To obtain the low-resolution image data, the image signal processor 130 may receive the signal D1 or D2 from the image sensor 110 or 120 including a low-resolution pixel array. Alternatively or additionally, to obtain the low-resolution image data, the image signal processor 130 may receive the signal D1 or D2 from the image sensor 110 or 120 including an ultra-high-resolution pixel array and may perform binning on the received signal.

In some example embodiments, based on one of the first signal D1 or the second signal D2, the image signal processor 130 may generate image data that have a relatively high resolution and are obtained by cropping a region of interest (ROI) corresponding to a specific object. The image signal processor 130 may transmit the ultra-high-resolution image data generated by the cropping to the main processor 400. In other words, the low-resolution image data may correspond to the whole image including at least one region of interest and photographed by the image sensor 110 or 120, while the ultra-high-resolution image data may correspond to a partial image of at least one region of interest. The number of image data transmitted to the main processor 400 every frame may be the same as the number of regions of interest. That is, image data corresponding to a region of interest may be independently transmitted to the main processor 400.

The user interface 200 may arbitrate communication between a user and the electronic device 10. For example, the user interface 200 may include an input interface such as a touch screen, a touch pad, a microphone, a key pad, a button, a vision sensor, a motion sensor, or a gyroscope sensor. Accordingly, a user input as described herein may be received based on user interaction with a touch pad of the user interface 200.

The display device 300 may provide the user with the whole low-resolution image including at least one region of interest or a partial ultra-high-resolution image corresponding to only at least one region of interest. For example, the display device 300 may include an organic LED (OLED) display device, an active matrix OLED (AMOLED) display device, a light-emitting diode (LED) display device, a liquid crystal display (LCD) device, etc.

The main processor 400 may perform various operations for controlling overall operations of the electronic device 10. For example, the main processor 400 may be implemented with a general-purpose processor, a special-purpose processor, or an application processor, and may include one or more processor cores. The main processor 400 may control the image processing block 100 for obtaining image data associated with an object outside the electronic device 10.

In some example embodiments, the main processor 400 may detect at least one region of interest from image data corresponding to the first frame from among pieces of image data output from the image signal processor 130. The main processor 400 may transmit information about the at least one region of interest to the image signal processor 130 through a camera control interface (CCI). The information about the at least one region of interest may be used for the image signal processor 130 to crop a portion of an image, which corresponds to the at least one region of interest.

The main processor 400 may provide the low-resolution image received from the image signal processor 130 to the user through the display device 300. The main processor 400 may provide the user with a cropped image of an ultra-high resolution received from the image signal processor 130 in response to a user input through the user interface 200. In other words, a field of view may transition from the whole low-resolution image to a partial image (i.e., an ROI) of an ultra-high resolution in response to the user input through the user interface 200.

Meanwhile, the main processor 400 may receive image data from the image signal processor 130 through a camera serial interface (CSI). To this end, the main processor 400 may include a CSI receiver, and the image signal processor 130 may include a CSI transmitter. The CSI receiver and the CSI transmitter may be interconnected through a plurality of lanes.

However, a bandwidth of the CSI may not be sufficient enough to transmit pieces of ultra-high-resolution image data photographed by the image sensor 110 or 120 every frame to the main processor 400 in real time. However, the CSI may be sufficient enough to transmit the whole low-resolution image data converted from pieces of ultra-high-resolution image data, and partial image data of an ultra-high resolution associated with at least one region of interest to the main processor 400 in real time.

According to the above configuration of the inventive concepts, the image signal processor 130 transmits the whole low-resolution image, which is based on the whole ultra-high-resolution image data, and partial image data of a ultra-high resolution to the main processor 400 every frame, instead of transmitting ultra-high-resolution image data obtained every frame to the main processor 400 without modification. In some example embodiments, the image signal processor 130 transmits partial image data of an ultra-high resolution, which are based on the whole ultra-high-resolution image data, and the whole low-resolution image data to the main processor 400 every frame. As a result, based on the limited bandwidth of the CSI, an ultra-high-resolution image associated with a specific object that the user interests in may be selectively provided to the user.

Figure 2:
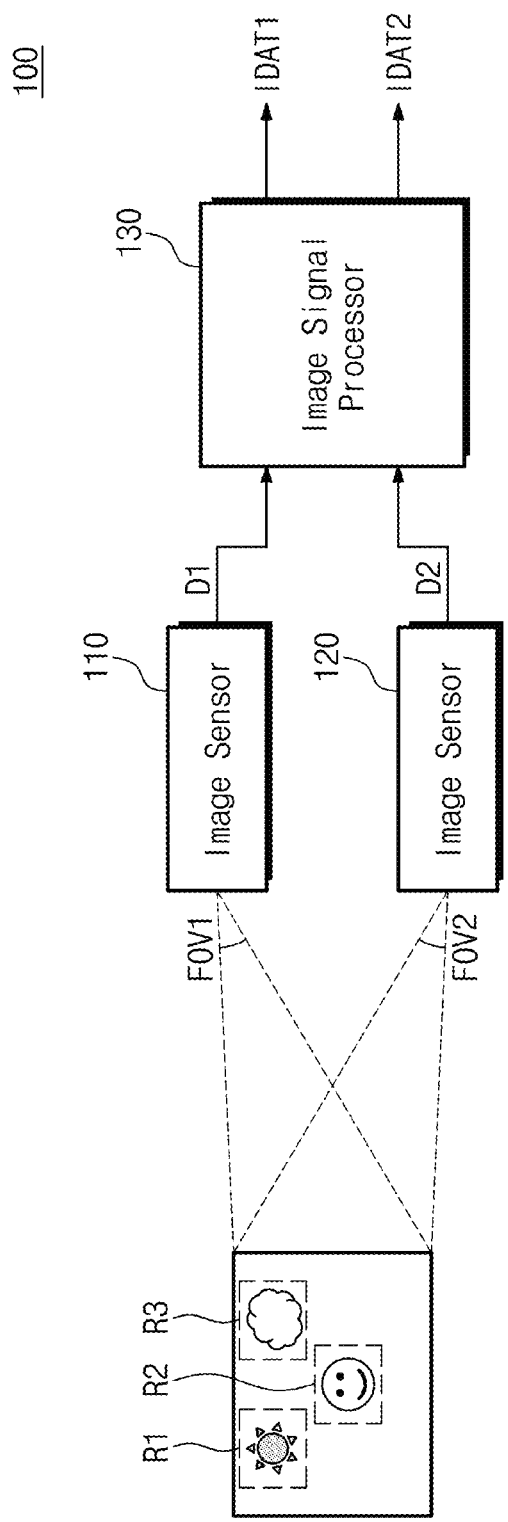
FIG. 2 is a block diagram for describing operations of image sensors of FIG. 1 according to some example embodiments of the inventive concepts.

FIG. 2 is a block diagram for describing operations of image sensors of FIG. 1 according to some example embodiments of the inventive concepts.

Referring to FIGS. 1 and 2, the first image sensor 110 may photograph an object in a first field of view FOV1, and the second image sensor 120 may photograph the object in a second field of view FOV2. The first field of view FOV1 and the second field of view FOV2 may be the same (e.g., identical) or different, and the first image sensor 110 and the second image sensor 120 may operate to sense an image of a relatively wide field of view. For example, the first lens 101 and the second lens 102 may be a wide lens or may be an ultra-wide lens.

The first image sensor 110 may receive a light reflected by an object in an area corresponding to the first field of view FOV1 and may generate the first signal D1 associated with an image of a relatively low resolution based on the received light. Restated, the first image sensor 110 may photograph the object in the first field of view FOV1 to generate the first signal D1. To this end, the first image sensor 110 may include a pixel sensor array of a low resolution.

As in the above description, the second image sensor 120 may receive a light reflected by an object in an area corresponding to the second field of view FOV2 and may generate the second signal D2 associated with an image of a relatively ultra-high resolution based on the received light. Restated, the second image sensor 120 may photograph the object in the second field of view FOV2 to generate the second signal D2. To this end, the second image sensor 120 may include a pixel sensor array of an ultra-high resolution.

The image signal processor 130 may be configured to generate first image data IDAT1 of a current frame based on the first signal D1 and may be configured to generate second image data IDAT2 of the current frame based on the second signal D2. For example, the image signal processor 130 may crop regions of interest R1, R2, and R3 from image data that are based on the second signal D2, and may output the cropped images as the second image data IDAT2.

Figure 3:
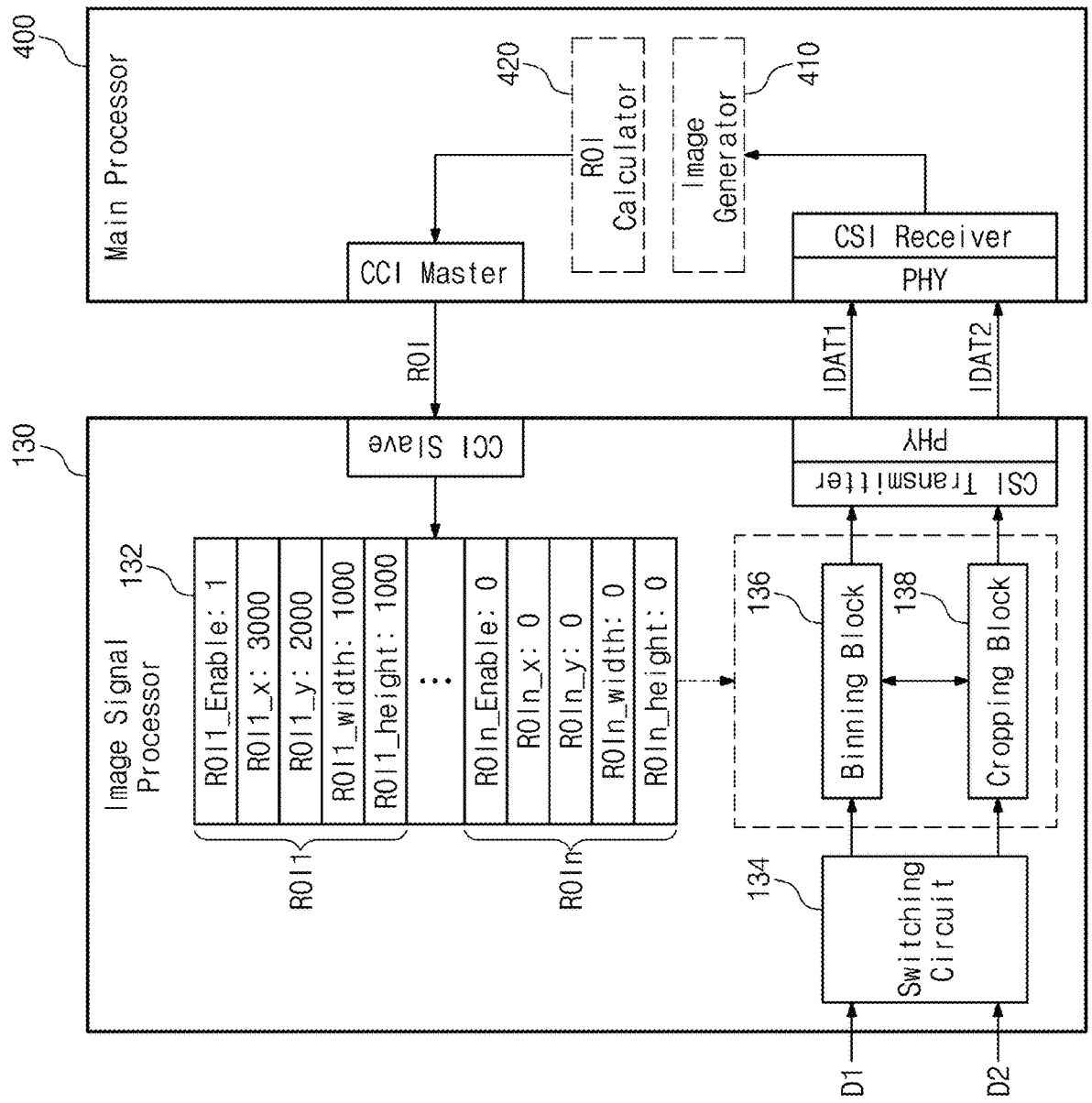
FIG. 3 illustrates a configuration of an image signal processor and a main processor of FIGS. 1 and 2 according to some example embodiments of the inventive concepts.

FIG. 3 illustrates a configuration of the image signal processor 130 and the main processor 400 of FIGS. 1 and 2 according to some example embodiments of the inventive concepts. The image signal processor 130 may include a register 132, a switching circuit 134, a binning block 136, and a cropping block 138. The main processor 400 may include an image generator 410 and an ROI calculator 420.

The main processor 400 may in advance calculate a region of interest for image data of a next frame from image data of a frame output from the image signal processor 130. To this end, the main processor 400 may include the image generator 410 and the ROI calculator 420 that are implemented with hardware, software, firmware, and/or a combination thereof. The image generator 410 may generate an image based on image data output from the image signal processor 130. The ROI calculator 420 may detect a region of interest from image data by using various manners and may obtain information about the region of interest. For example, the ROI calculator 420 may detect a region of interest by using various algorithms well known, and thus, additional description associated therewith will be omitted to avoid redundancy.

In some example embodiments, the register 132 of the image signal processor 130 may be set based on the information generated by the ROI calculator 420. Such information may include and/or indicate values associated with a region of interest ROI. Such values may include a value indicating whether the ROI is present in image data (e.g., first image data IDAT1), coordinates of the ROI on the image data (e.g., first image data IDAT1), a length of the region of interest in a first direction, and a length of the region of interest in a second direction which may be different from the first direction. As such, a value indicating whether an ROI is present in image data, and values associated with an X coordinate, a Y coordinate, a width, and a height of the ROI in the image data may be stored in the register 132. For example, when a specific region of interest (e.g., ROI1) is detected by the ROI calculator 420, a register value indicating the existence of the detected region of interest may be set to bit "1" (ROI1 Enable: 1). The register 132 may store information associated with ROIs 1 to n, where n is a positive integer.

The main processor 400 may transmit the information about the ROI to the image signal processor 130 through the CCI. It will be understood that, as shown in FIG. 3, the CCI slave of the image signal processor 130 may be understood to be a CCI of the image signal processor 130 that is configured to receive values associated with the ROI from the main processor 400. The image signal processor 130 may store the received information about the ROI in the register 132. Accordingly, the register 132 will be understood to be configured to store received values associated with the ROI (which are received from the main processor 400 via the CCI of the image signal processor 130). For example, the register 132 is illustrated as a component that stores information about an ROI, not limited thereto. For example, various devices such as a dynamic random access memory (DRAM) and a static random access memory (SRAM) may be adopted to store information.

When the information about the ROI is received from the main processor 400, the image signal processor 130 may check the register value (e.g., ROI1 Enable) indicating whether an ROI exists, and may operate the switching circuit 134 based on the checked value.

In some example embodiments, when it is checked that the ROI exists in the register 132 referenced by the image signal processor 130, the image signal processor 130 may control the switching circuit 134, and thus, the second signal D2 associated with a ultra-high-resolution image may be input to the cropping block 138. The first signal D1 associated with a low-resolution image may be input to the binning block 136 or may not be input thereto. Here, various example embodiments in which binning and/or cropping is performed on the signals D1 and D2 will be described with reference to the following drawings in detail.

Afterwards, the binning block 136 may perform a binning operation for reducing a resolution, with respect to image data based on at least one of the signals D1 or D2 or cropped image data processed by the cropping block 138. The cropping block 138 may perform a cropping operation for obtaining an area corresponding to an ROI, with respect to image data based on at least one of the signals D1 or D2 or binned image data processed by the binning block 136. For example, the binning block 136 and the cropping block 138 may be implemented with hardware, software, firmware, and/or a combination thereof.

The image signal processor 130 may transmit image data processed by the binning block 136 and/or the cropping block 138 to the main processor 400 through a CSI transmitter and a physical layer PHY. Restated, the CSI transmitter and the physical layer PHY may be configured to transmit the first image data IDAT1 and the cropped image data (e.g., IDAT2, IDAT_C1, IDAT_C2, and/or IDAT_C3). For example, the first image data IDAT1 may correspond to the whole low-resolution image, and the second image data IDAT2 may correspond to a partial image of an ultra-high resolution associated with an ROI. Accordingly, it will be understood that the image signal processor 130 may be configured to transmit the first image data IDAT1 and cropped image data (e.g., IDAT2, IDAT_C1, IDAT_C2, and/or IDAT_C3) to the main processor 400 through a camera serial interface (CSI) (e.g., the CSI transmitter). The main processor 400 may receive the image data processed by the image signal processor 130 through a physical layer PHY and a CSI receiver. Restated, the main processor 400 may include a CSI receiver and physical layer PHY configured to receive the first image data IDAT1 and cropped image data (e.g., IDAT2, IDAT_C1, IDAT_C2, and/or IDAT_C3).

In general, considering a bandwidth of the CSI, it may be impossible to transmit the whole ultra-high-resolution image to the main processor 400 through the CSI every frame. However, according to the image processing of the inventive concepts, the whole low-resolution image data and partial image data of an ultra-high resolution may be transmitted to the main processor 400 in real time, and thus, an issue due to the limited bandwidth of the CSI may be solved.

Figure 4:
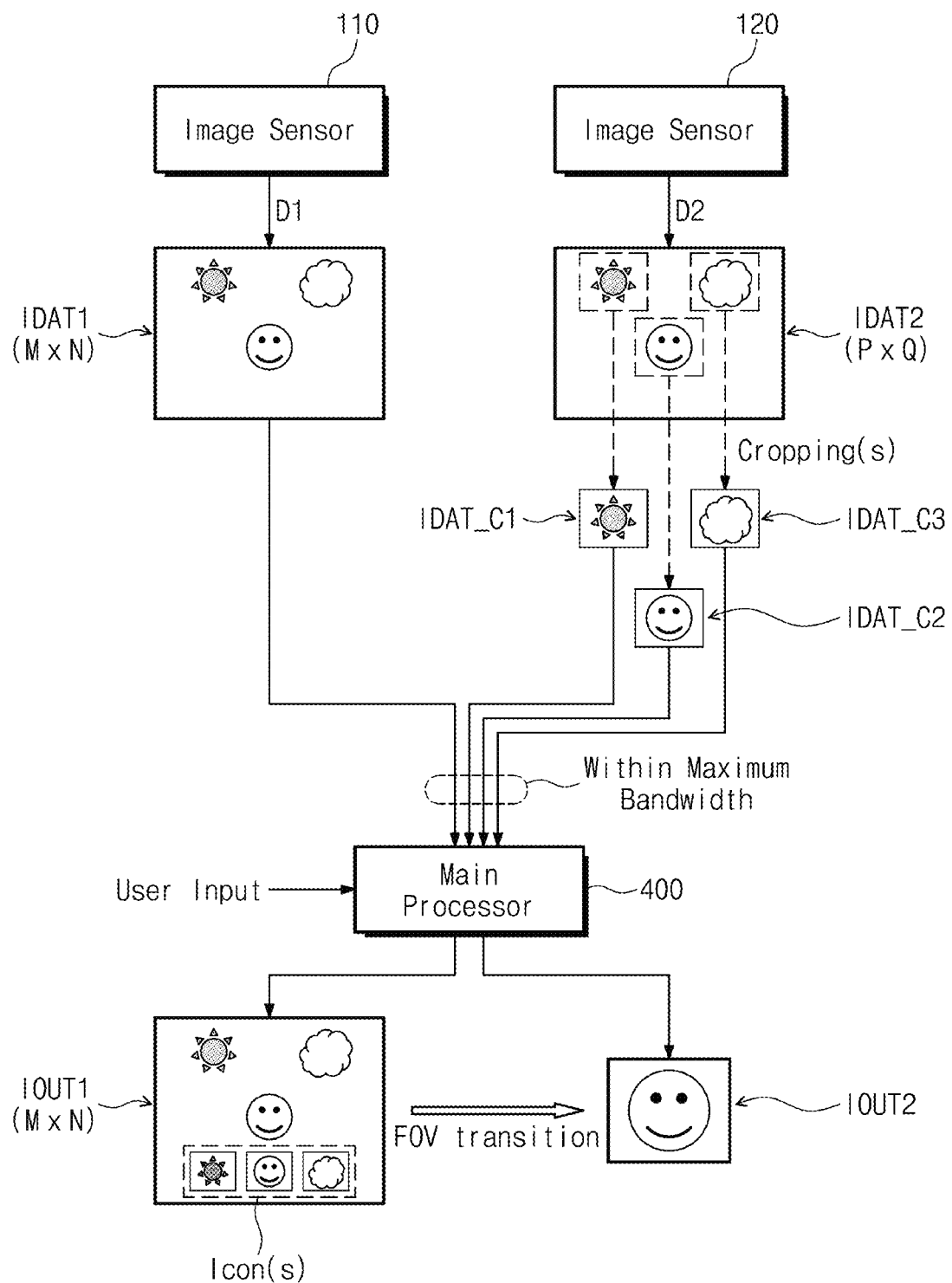
FIG. 4 conceptually illustrates an operation of an image signal processor of FIG. 3 according to some example embodiments of the inventive concepts.

FIG. 4 conceptually illustrates an operation of the image signal processor 130 of FIG. 3 according to some example embodiments of the inventive concepts.

How to process two image data photographed in the same field of view will be described with reference to FIGS. 1, 3, and 4.

Prior to the description of FIG. 4, when an image output through a display device, or video recording is started by the user, first, to allow the main processor 400 to obtain information about an ROI, the first image sensor 110 photographs an object to generate the first signal D1 associated with a first frame. The image signal processor 130 generates the first image data IDAT1 of a low resolution based on the first signal D1 received from the first image sensor 110 and transmits first image data of a first frame to the main processor 400. The ROI calculator 420 may obtain the information about the ROI from the first image data IDAT1 by using various ROI-related techniques well known and may transmit the obtained information to the image signal processor 130. However, data of an image that is photographed to obtain the ROI may be based on the second image sensor 120 as well as the first image sensor 110.

Meanwhile, because a resolution of the first image sensor 110 and a resolution of the second image sensor 120 are different, a resolution of the first image data IDAT1 and a resolution of the second image data IDAT2 may be different. Because the resolution of the first image data IDAT1 and the resolution of the second image data IDAT2 are different, values (i.e., coordinates, a width, and a height) associated with a region of interest obtained from the first image data IDAT1 may be different from values (i.e., coordinates, a width, and a height) associated with a region of interest of the second image data IDAT2 to be actually cropped. However, because the first image data IDAT1 and the second image data IDAT2 have the same aspect ratio, the main processor 400 may calculate the values associated with the region of interest on the second image data IDAT2 to be actually cropped, in consideration of the resolution of the first image data IDAT1 and the resolution of the second image data IDAT2.

Afterwards, referring to FIG. 4, the first image sensor 110 photographs an object to generate the first signal D1 associated with a second frame, and the second image sensor 120 photographs the object to generate the second signal D2 associated with the second frame. The image signal processor 130 may obtain the first image data IDAT1 of a low resolution based on the first signal D1 received from the first image sensor 110 and may obtain the second image data IDAT2 of an ultra-high resolution based on the second signal D2 received from the second image sensor 120.

In some example embodiments, the first image sensor 110 may include a pixel array composed of "N" rows each including "M" pixels. The second image sensor 120 may include a pixel array composed of "Q" rows each including "P" pixels. Accordingly, the resolution of the first image data IDAT1 may be "M×N", and the resolution of the second image data IDAT2 may be "P×Q". Here, "P" may be greater than "M", and "Q" may be greater than "N".

The image signal processor 130 may output the first image data IDAT1 to the main processor 400 without performing special processing on the first image data IDAT1. In this case, the first image data IDAT1 transmitted to the main processor 400 may be used to obtain information about an ROI for a third frame. The image signal processor 130 may crop an area associated with an ROI (e.g., crop the ROI) from the second image data IDAT2 of the second frame with reference to pieces of information about the ROI obtained from image data of the first frame (e.g., with reference to the values associated with the ROI which are stored in the register 132). As a result, first cropped image data IDAT_C1 associated with the first ROI R1, second cropped image data IDAT_C2 associated with the second ROI R2, and third cropped image data IDAT_C3 associated with the third ROI R3 may be generated. The image signal processor 130 may transmit the cropped image data IDAT_C1, IDAT_C2, and IDAT_C3 to the main processor 400. For example, the image signal processor 130 may be configured to generate cropped image data (e.g., first, second, and/or third cropped image data IDAT_C1, IDAT_C2, and/or IDAT_C3) based on cropping a region of interest (e.g., first, second, and/or third ROI R1, R2, and/or R3) from the second image data IDAT2.

However, unlike some example embodiments, including the example embodiments shown in FIG. 4, an example is illustrated in FIG. 3 as the second image data IDAT2 are transmitted to the main processor 400. The reason is that a detailed process associated with cropping is not illustrated in FIG. 3. Accordingly, in the case of applying the example of FIG. 3 to the example embodiments shown in FIG. 4, the example of FIG. 3 should be understood as the cropped image data IDAT_C1, IDAT_C2, and IDAT_C3, not the second image data IDAT2, are transmitted to the main processor 400. This will be similarly applied to other embodiments to be described below.

Afterwards, the main processor 400 may receive the whole image data of a low resolution (i.e., M×N) and partial image data of a high resolution in real time every frame. The main processor 400 may store a video stream based on the whole image data of a low resolution and a video stream based on image data of a high resolution in a memory device such as a universal flash storage (UFS) card, embedded FUS storage, a secure digital (SD) card, a solid state drive (SSD), and/or an embedded multimedia card (eMMC). For example, video streams may be stored in a format capable of being reproduced selectively by the user.

In some example embodiments, by default, the main processor 400 may provide the user with (e.g., generate, output, transmit, etc.) a video stream IOUT1, which is based on the whole image data of the low resolution (i.e., M×N), through the display device 300 in real time. Accordingly, the main processor 400 may generate a first video stream (e.g., IOUT1) based on the first image data IDAT1, generate a second video stream (e.g., IOUT2) based on the cropped image data (e.g., IDAT_C1, IDAT_C2, and/or IDAT_C3), and output (e.g., transmit) the first video stream (e.g., IOUT1) to a display device 300. In response to a user input, the main processor 400 may change an operation (or a mode/manner) of providing the video stream IOUT1 of the whole low-resolution image data to an operation (or a mode/manner) of providing a video stream IOUT2 of partial high-resolution image data. For example, in the case where the user directly touches the second ROI R2 displayed on a display device (or a touch screen), the main processor 400 may stop outputting the whole low-resolution image to the display device 300 and may switch to output a partial high-resolution image corresponding to the second ROI R2 to the display device. That is, at the same time when a field of view transitions from the whole image to a partial image occurs, a change from an output of the whole low-resolution image to an output of the whole high-resolution image is made (i.e., a scanning zoom is implemented). Accordingly, the main processor 400 may be configured to, after initiating the outputting of the first video stream (e.g., IOUT1) to a display device 300, stop outputting the first video stream to the display device 300 and initiate outputting the second video stream (e.g., IOUT2) to the display device 300 in response to a user input command (e.g., also referred to herein as a user input, which may be received based on user interaction with a user interface 200 and/or the display device 300). Such stopping of outputting the first video stream and initiating outputting the second video stream may be referred to as switching from outputting the first video stream to outputting the second video stream.

In some example embodiments, in addition to the case where the user directly touches an ROI of an image displayed on the display device 300, icons for touch respectively corresponding to ROIs may be provided on the display device 300, and a field of view may transition as the user touches an icon corresponding to each ROI. In this case, the icons for touch may be based on the cropped image data IDAT_C1, IDAT_C2, and IDAT_C3.

In some example embodiments, unlike some example embodiments, including the example embodiments illustrated in FIG. 4, a field of view may transition through voice recognition. In this case, the main processor 400 may further include a separate component (e.g., software or firmware for object recognition) capable of recognizing a detailed shape of an object from an ROI, and may further include a voice recognition module capable of recognizing a voice of the user.

However, depending on a size of the first image data IDAT1, sizes of ROIs of the second image data IDAT2, and/or the number of ROIs of the second image data IDAT2, the case where it is impossible to transmit the first image data IDAT1 and the cropped image data IDAT_C1, IDAT_C2, and IDAT_C3 to the main processor 400 in real time without buffering may occur. This will be described with reference to FIGS. 5 to 7.

Figure 5:
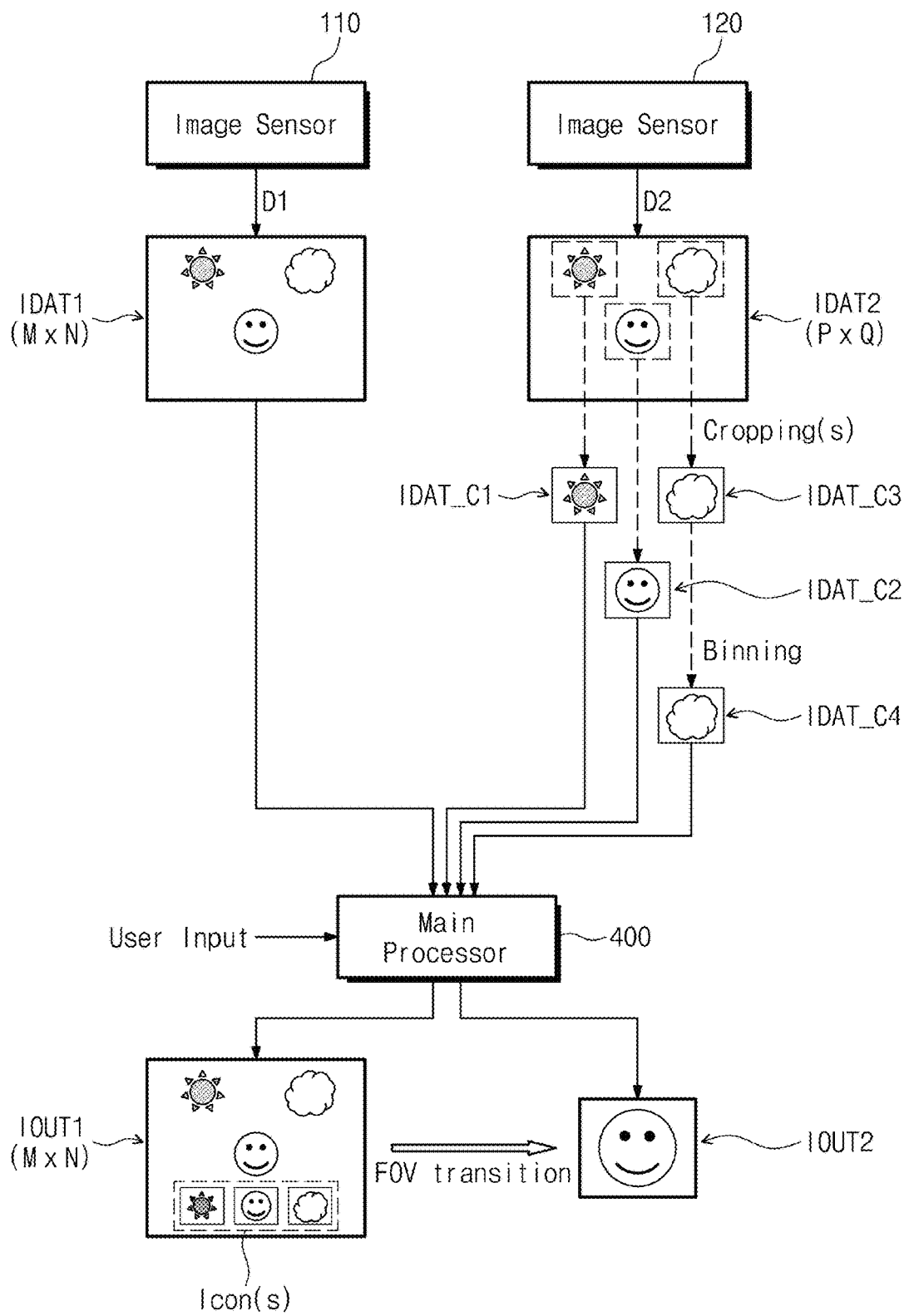
FIG. 5 conceptually illustrates an operation of an image signal processor of FIG. 3 according to some example embodiments of the inventive concepts.

FIG. 5 conceptually illustrates an operation of the image signal processor 130 of FIG. 3 according to some example embodiments of the inventive concepts.

The example embodiments shown in FIG. 5 are mostly similar to the example embodiments shown in FIG. 4, and thus, additional description will be omitted to avoid redundancy. However, in the case where a size of the second image data IDAT2 is large or the number of ROIs of the second image data IDAT2 is many, there may be required additional processing in consideration of the bandwidth of the CSI. Accordingly, the image signal processor 130 may be configured to generate a cropped image data based on a bandwidth of the CSI (e.g., may generate the cropped image to not be too large for transmission due to the bandwidth of the CSI, also referred to herein as generating the cropped image to have a size that is within a size, such as a maximum size, defined by the bandwidth of the CSI).

In some example embodiments, the image signal processor 130 may further perform binning on at least one of the cropped image data IDAT_C1, IDAT_C2, or IDAT_C3. An example is illustrated as image data IDAT_C4 are generated by further performing additional binning on the cropped image data IDAT_C3 corresponding to the third ROI R3.

In some example embodiments, with reference to information about an ROI calculated from image data of a current frame, the main processor 400 may in advance determine whether image data of a next frame are smoothly transmitted from the image signal processor 130 to the main processor 400. When it is determined that the transmission of image data from the image signal processor 130 to the main processor 400 is smooth, the image data may be processed according to some example embodiments, including the example embodiments described with reference to FIG. 4. For example, sizes of pieces of image data of a current frame transmitted from the image signal processor 130 may be considered to determine whether the transmission of image data of a next frame is smooth.

In contrast, when it is determined that the transmission of image data from the image signal processor 130 to the main processor 400 is not smooth, the main processor 400 may additionally transmit information indicating that additional processing for the cropped image data IDAT_C1, IDAT_C2, and IDAT_C3 is required, to the image signal processor 130. The image signal processor 130 may perform binning on at least one of the cropped image data IDAT_C1, IDAT_C2, or IDAT_C3, based on the information additionally received from the main processor 400.

As a result, the first image data IDAT1, the cropped image data IDAT_C1 and IDAT_C2, and the image data IDAT_C4 obtained through cropping and binning may be transmitted to the main processor 400 in real time within the bandwidth of the CSI. Accordingly, the image signal processor 130 may be configured to generate a cropped image data based on a bandwidth of the CSI (e.g., may generate the cropped image to not be too large for transmission due to the bandwidth of the CSI).

Figure 6:
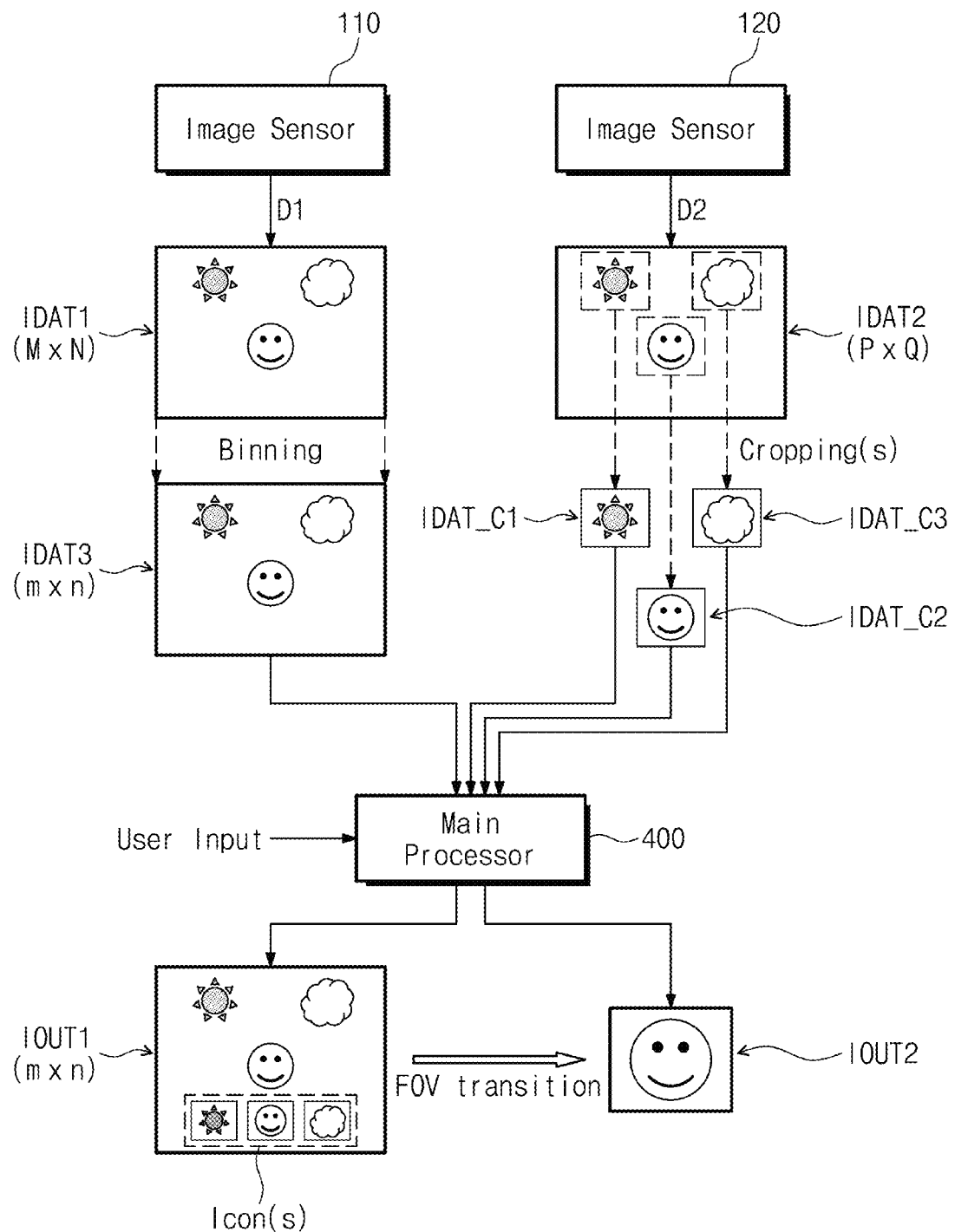
FIG. 6 conceptually illustrates an operation of an image signal processor of FIG. 3 according to some example embodiments of the inventive concepts.

FIG. 6 conceptually illustrates an operation of the image signal processor 130 of FIG. 3 according to some example embodiments of the inventive concepts.

The example embodiments shown in FIG. 6 are mostly similar to the example embodiments shown in FIG. 4, and thus, additional description will be omitted to avoid redundancy. However, in the case where a size of the first image data IDAT1 is large, there may be required additional processing in consideration of the bandwidth of the CSI. Accordingly, the image signal processor 130 may be configured to generate a cropped image data based on a bandwidth of the CSI (e.g., may generate the cropped image to not be too large for transmission due to the bandwidth of the CSI).

In some example embodiments, the main processor 400 may transmit information indicating that there is required additional processing (e.g., binning) for the first image data IDAT1, to the image signal processor 130. The image signal processor 130 may further perform binning on the first image data IDAT1, based on the information additionally received from the main processor 400.

As a result, the resolution (M×N) of the first image data IDAT1 may decrease to a resolution (m×n) of third image data IDAT3, and a size of image data may decrease. The image signal processor 130 may transmit the third image data IDAT3 and the cropped image data IDAT_C1, IDAT_C2, and IDAT_C3 to the main processor 400 in real time. Accordingly, the image signal processor 130 may generate third image data IDAT3 based on performing binning on the first image data IDAT1.

Figure 7:
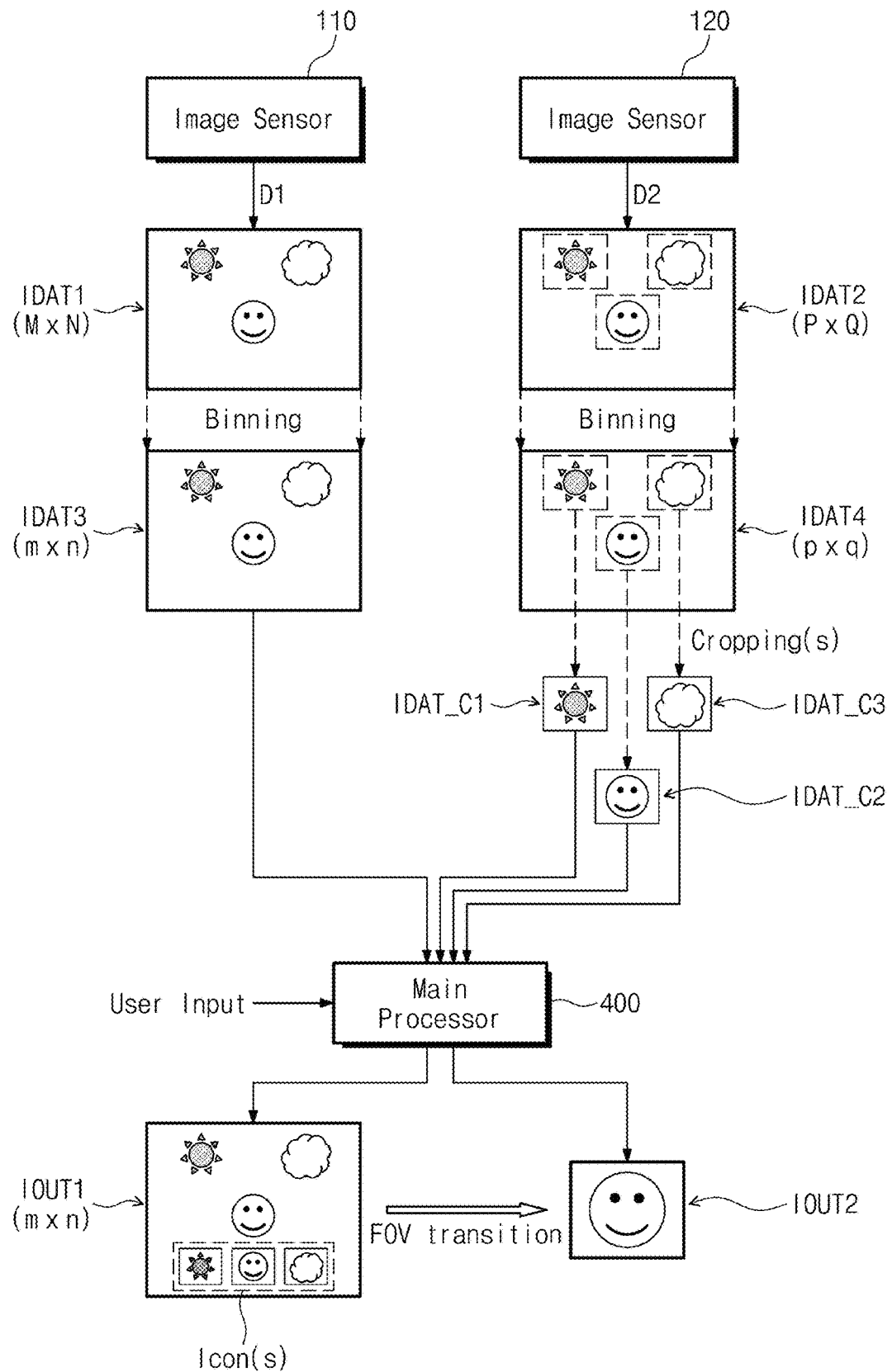
FIG. 7 conceptually illustrates an operation of an image signal processor of FIG. 3 according to some example embodiments of the inventive concepts.

FIG. 7 conceptually illustrates an operation of the image signal processor 130 of FIG. 3 according to some example embodiments of the inventive concepts.

The example embodiments shown in FIG. 7 are mostly similar to the example embodiments shown in FIG. 4, and thus, additional description will be omitted to avoid redundancy. However, in the case where sizes of the first image data IDAT1 and the second image data IDAT2 are large, there may be required additional processing in consideration of the bandwidth of the CSI. Accordingly, the image signal processor 130 may be configured to generate a cropped image data based on a bandwidth of the CSI (e.g., may generate the cropped image to not be too large for transmission due to the bandwidth of the CSI).

In some example embodiments, the main processor 400 may transmit information indicating that there is required additional processing (e.g., binning) for the first image data IDAT1 and the second image data IDAT2, to the image signal processor 130. The image signal processor 130 may further perform binning on the first image data IDAT1 and the second image data IDAT2, based on the information additionally received from the main processor 400.

As a result, the resolution (M×N) of the first image data IDAT1 may decrease to the resolution (m×n) of the third image data IDAT3, and a size of image data may decrease. The resolution (P×Q) of the second image data IDAT2 may decrease to a resolution (p×q) of fourth image data IDAT4, and the cropped image data IDAT_C1, IDAT_C2, and IDAT_C3 may be generated from the fourth image data IDAT4. Accordingly, the image signal processor 130 may generate fourth image data IDAT4 based on performing binning on the second image data IDAT2.

The image signal processor 130 may transmit the third image data IDAT3 and the cropped image data IDAT_C1, IDAT_C2, and IDAT_C3 to the main processor 400 in real time.

Figure 8:
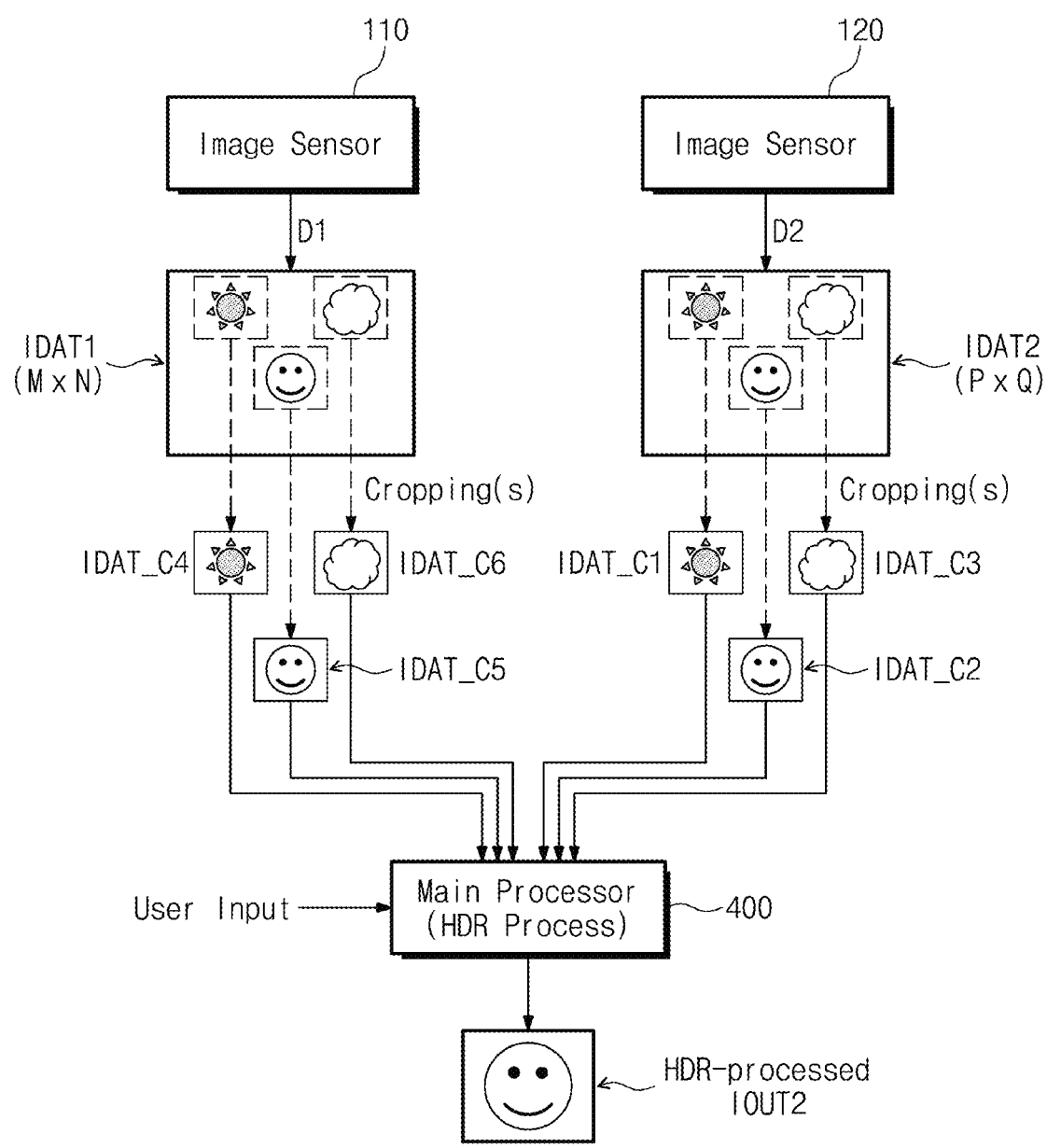
FIG. 8 conceptually illustrates an operation of an image signal processor when a field of view transitions by a user input, in some example embodiments of FIG. 4 according to some example embodiments of the inventive concepts.

FIG. 8 conceptually illustrates an operation of the image signal processor 130 when a field of view transitions by a user input, in the example embodiments shown in FIG. 4 according to some example embodiments of the inventive concepts. In detail, the example embodiments shown in FIG. 8 illustrate how to process a partial ultra-high-resolution image (i.e., an ROI), upon a transition of a field of view from the whole low-resolution image to the partial ultra-high-resolution image.

In some example embodiments, when the main processor 400 makes a transition of a field of view to a partial ultra-high-resolution image in response to a user input, the image signal processor 130 may perform high dynamic range (HDR) processing on the partial ultra-high-resolution image. For example, the main processor 400 may transmit, to the image signal processor 130, a signal providing notification that a user input directing a transition of a field of view from the whole image to a partial image is received. In response to the notification from the main processor 400, the image signal processor 130 may crop areas of the first image data IDAT1, which correspond to ROIs, and thus may generate image data IDAT_C4, IDAT_C5, and IDAT_C6. The image signal processor 130 may transmit the cropped image data IDAT_C1, IDAT_C2, IDAT_C3, IDAT_C4, IDAT_C5, and IDAT_C6 to the main processor 400.

The main processor 400 may merge the image data IDAT_C1 corresponding to the first ROI R1 and the image data IDAT_C4 corresponding to the first ROI R1 to generate an HDR-processed video stream IOUT2. Because the cropped image data IDAT_C1 and the cropped image data IDAT_C4 are based on signals output from the image sensors 110 and 120 having different characteristics, dynamic ranges of the cropped image data IDAT_C1 and the cropped image data IDAT_C4 may be different. Accordingly, partial image data of a ultra-high resolution having a wider dynamic range may be obtained by merging the image data IDAT_C1 and IDAT_C4 having different dynamic ranges.

As in the above description, the main processor 400 may merge the image data IDAT_C2 and IDAT_C5 corresponding to the second ROI R2 to generate HDR-processed partial image data, and may merge the image data IDAT_C3 and IDAT_C6 corresponding to the third ROI R3 to generate HDR-processed partial image data. Video streams each based on partial image data may be stored in a memory device such as a UFS card, embedded storage, an SD card, an SSD, and/or an eMMC.

Meanwhile, in addition to the HDR processing performed based on image data output from the image sensors 110 and 120 having different characteristics, additional processing for making a dynamic range of an image wide may be performed. In some example embodiments, the image sensors 110 and 120 may adjust the amount of light received from the outside of the electronic device 10 under control of the main processor 400. The main processor 400 may adjust shutter speeds of the image sensors 110 and 120 for adjusting the amount of light collected from the outside. In some example embodiments, the main processor 400 may adjust aperture values of the image sensors 110 and 120 for adjusting the amount of light collected from the outside of the electronic device 10.

To adjust the shutter speeds and/or aperture values of the image sensors 110 and 120, the main processor 400 may control mechanical devices included in the image sensors 110 and 120 or may control pixels included in the image sensors 110 and 120. As a result, a dynamic range of a partial image of an ultra-high resolution may be further improved. In addition, the example embodiments shown in FIG. 8 relate to HDR processing performed when a field of view transitions in the example embodiments shown in FIG. 4, but example embodiments are not limited thereto. That is, the example embodiments shown in FIG. 8 may be identically applied to the example embodiments shown in FIGS. 5 to 7.

Figure 9:
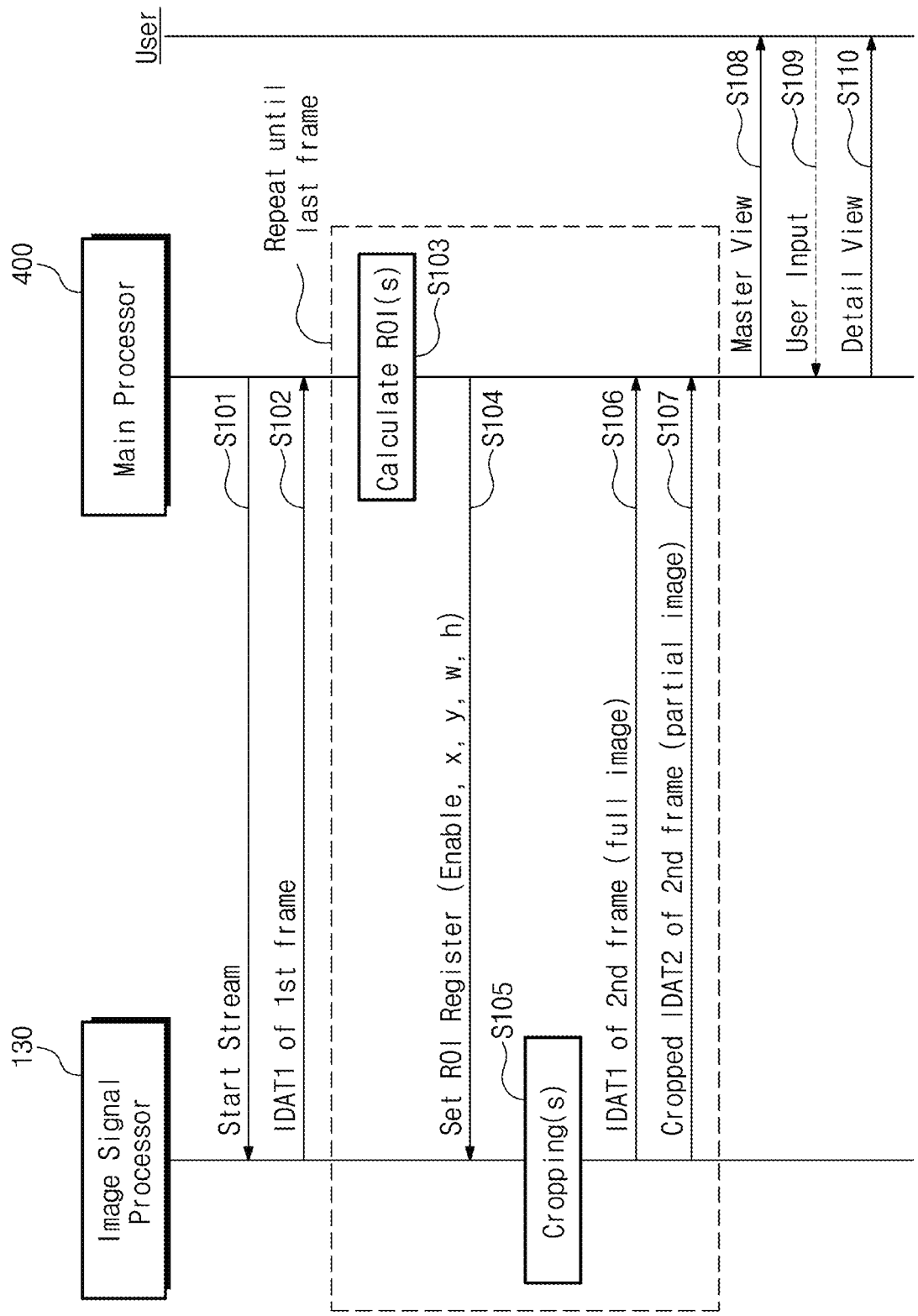
FIG. 9 is a flowchart illustrating various processing performed by an image signal processor and a main processor according to some example embodiments of the inventive concepts.

FIG. 9 is a flowchart illustrating various processing performed by an image signal processor and a main processor according to some example embodiments of the inventive concepts.

Referring to FIGS. 1, 4, and 9, in operation S101, the main processor 400 may transmit, to the image signal processor 130, a start stream notifying an output of an image through a display device or a record of an image. For example, the start stream may include various instructions and/or control signals associated with an output of an image through a display device or a record of an image.

In operation S102, the image signal processor 130 may generate the image data IDAT1 of a first frame and may transmit the image data IDAT1 to the main processor 400. For example, the first image data IDAT1 may be generated based on the signal D1 output from the first image sensor 110 including a pixel sensor array of a low resolution, not limited thereto.

In operation S103, the main processor 400 may detect an ROI from the image data IDAT1 of the first frame received from the image signal processor 130 and may calculate values associated with the detected ROI. For example, the values associated with the ROI may include a value indicating whether the ROI is present in image data, and values associated with an X coordinate, a Y coordinate, a width, and a height of the ROI. For example, the values associated with the ROI may be transmitted to the image signal processor 130 through a camera control interface.

In operation S104, the register 132 of the image signal processor 130 may be set depending on the values associated with the ROI. In detail, the main processor 400 may transmit the values associated with the ROI to the image signal processor 130, and the image signal processor 130 may store the values associated with the ROI in the register 132.

In operation S105, to generate a second frame, the image signal processor 130 may generate the first image data IDAT1 based on the signal D1 received from the first image sensor 110 and may generate the second image data IDAT2 based on the signal D2 received from the second image sensor 120. The cropping block 138 of the image signal processor 130 may crop an area associated with the ROI from the second image data IDAT2 of an ultra-high resolution.

In operation S106, the image signal processor 130 may transmit the first image data IDAT1 corresponding to the whole low-resolution image to the main processor 400. In operation S107, the image signal processor 130 may transmit cropped image data IDAT2 corresponding to a partial image of a high resolution to the main processor 400. For example, the main processor 400 may store a video stream based on the first image data IDAT1 (e.g., first video stream IOUT1) and a video stream based on the second image data IDAT2 (e.g., second video stream IOUT2) in the electronic device 10 as separate files. It will be understood that the second frame (and subsequent frames) may be referred to as a "current frame" and the first frame or a frame generated previously to the "current frame" may be referred to as a "previous frame." Accordingly, it will be understood that, where the main processor 400 is configured to generate first and second video streams (e.g., IOUT1 and IOUT2) based on first and second image data (respectively) of a current frame (e.g., 2nd frame), the main processor 400 may detect an ROI based on first image data which corresponds to a previous frame of the current frame (e.g., IDAT1 of the 1st frame) and which are generated by the first image sensor 110 and may calculate values associated with the region of interest (e.g., at S103).

In operation S108, the main processor 400 may provide the user with the video stream based on the first image data IDAT1 as a master view. While the video stream of the first image data IDAT1 is provided to the user, when there is made a user input to a specific ROI, such as a touch of the user through a touch screen or a voice of the user (S109), the main processor 400 may stop providing the video stream based on the first image data IDAT1 and may provide the user with the video stream based on the second image data IDAT2 as a detail view. That is, a field of view may transition from a master view to a detail view based on a user input, for example in response to receiving a user input command (S110).

Meanwhile, operation S103 in which the main processor 400 calculates values associated with an ROI based on the first image data IDAT1 received from the image signal processor 130 to operation S107 in which the main processor 400 obtains a partial image of a high resolution from the second image data IDAT2 may be performed until the last frame of a photographed image is processed.

Figure 10:
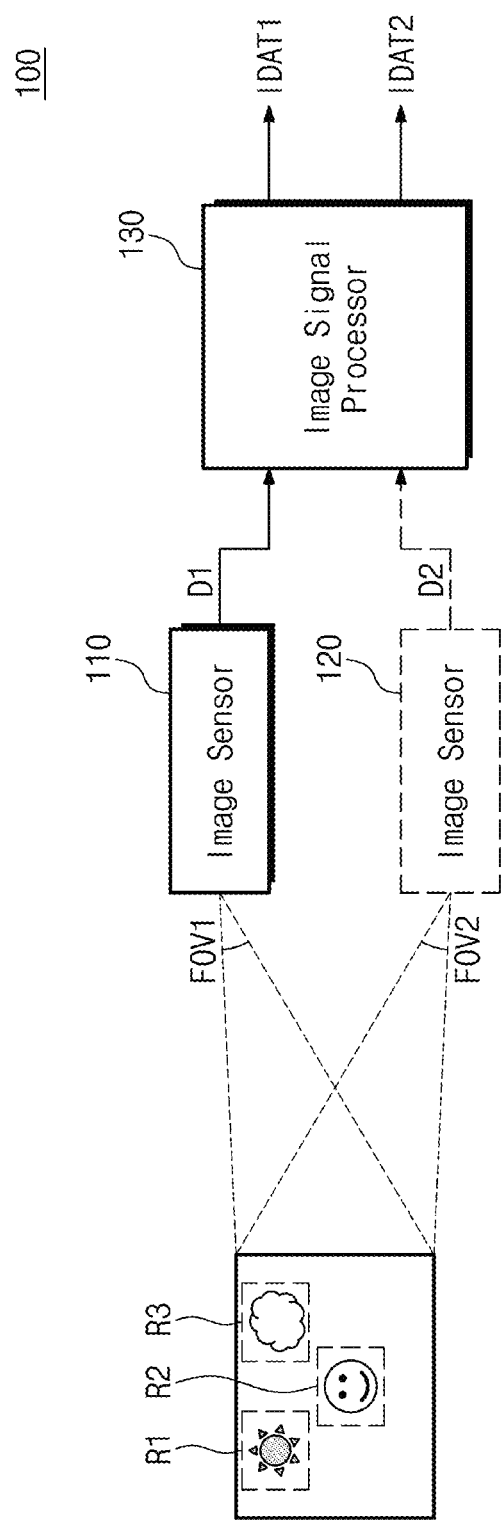
FIG. 10 is a block diagram for describing operations of image sensors of FIG. 1 according to some example embodiments of the inventive concepts.

FIG. 10 is a block diagram for describing operations of image sensors of FIG. 1 according to some example embodiments of the inventive concepts.

Unlike some example embodiments, including example embodiments shown in one or more of FIGS. 1-9, the example embodiments shown in FIG. 10 relate to a transition of a field of view from the whole image of a low resolution to a partial image of a high resolution by using one image sensor. In some example embodiments, the first image sensor 110 may photograph an object in the first field of view FOV1, and the second image sensor 120 may not operate. For example, the first image sensor 110 may operate to sense an image of a relatively wide field of view. For example, the first lens 101 may be a wide lens or may be an ultra-wide lens. The first field of view FOV1 of the first image sensor 110 and the second field of view FOV2 of the second image sensor 120 are illustrated as identical, but the first field of view FOV1 and the second field of view FOV2 could be different.

The first image sensor 110 may receive a light reflected by an object in an area corresponding to the first field of view FOV1 and may generate the first signal D1 associated with a ultra-high-resolution image based on the received light. To this end, the first image sensor 110 may include a pixel sensor array of a high resolution. The image signal processor 130 may generate first image data IDAT1 and second image data IDAT2 based on the first signal D1. For example, the image signal processor 130 may perform binning and cropping on image data based on the first signal D1 and may generate the first image data IDAT1 and the second image data IDAT2, respectively.

Figure 11:
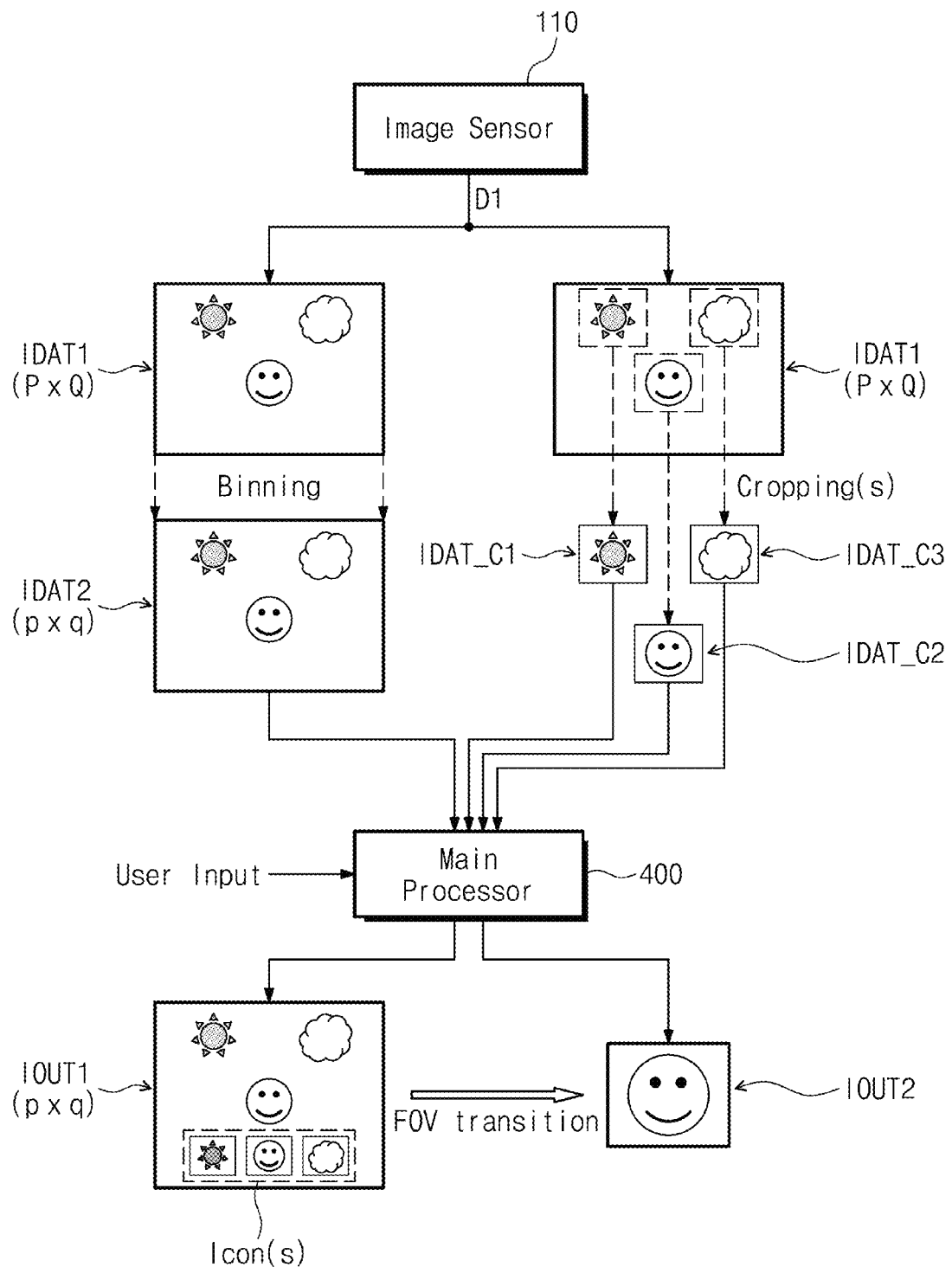
FIG. 11 conceptually illustrates an operation of an image signal processor of FIG. 10 according to some example embodiments of the inventive concepts.

FIG. 11 conceptually illustrates an operation of the image signal processor 130 of FIG. 10 according to some example embodiments of the inventive concepts.

How to process one ultra-high-resolution image data will be described with reference to FIGS. 1, 10, and 11. The image signal processor 130 may obtain the first image data IDAT1 associated with a current frame based on the first signal D1 received from the first image sensor 110. As described above, the first signal D1 may be associated with the whole ultra-high-resolution image photographed in a wide field of view. For example, the first image sensor 110 may include a pixel array composed of "Q" rows each including "P" pixels. Accordingly, a resolution of the first image data IDAT1 may be "P×Q".

The image signal processor 130 may perform binning on the first image data IDAT1. As a result of the binning, the second image data IDAT2 having a lower resolution (i.e., "p×q") than the first image data IDAT1 may be generated. Restated, the image signal processor 130 may generate first image data IDAT1 of a current frame based on the first signal D1 and generate second image data IDAT2 of the current frame based on performing binning of the first image data IDAT1. The image signal processor 130 may crop areas associated with ROIs from the first image data IDAT1, with reference to pieces of information about the ROIs associated with a previous frame and received from the main processor 400. As a result, first cropped image data IDAT_C1 associated with the first ROI R1, second cropped image data IDAT_C2 associated with the second ROI R2, and third cropped image data IDAT_C3 associated with the third ROI R3 may be generated. Restated, the image signal processor 130 may generate cropped image data (e.g., IDAT_C1, IDAT_C2, and/or IDAT_C3) based on cropping a region of interest (e.g., R1, R2, and/or R3) form the first image data IDAT1.

The image signal processor 130 may transmit the whole image data of a low resolution (i.e., "p×q") and partial image data of a high resolution to the main processor 400 in real time. The main processor 400 may store the video stream IOUT1 based on the whole image data of the low resolution (e.g., a first video stream based on the second image data IDAT2) and the video stream IOUT2 corresponding to the partial image of the high resolution (e.g., a second video stream based on the cropped image data) in a memory device such as a UFS card, embedded UFS storage, an SD card, an SSD, and/or an eMMC.

By default, the main processor 400 may provide the user with the video stream IOUT1, which is based on the whole image data of the low resolution (i.e., "p×q"), through the display device 300 in real time (e.g., output the first video stream to the display device 300. In response to a user input (also described herein as a user input command), the main processor 400 may change an operation (or a mode/manner) of providing the video stream IOUT1 to an operation (or a mode/manner) of providing the video stream IOUT2. Restated, the main processor 400 may stop outputting the first video stream (e.g., IOUT1) to the display device and switch to (e.g., initiate) outputting the second video stream (e.g., IOUT2) to the display device in response to receiving a user input command. That is, a field of view transitions from the whole low-resolution image to a partial high-resolution image in response to a user input such as a touch or a voice of the user.

Unlike some example embodiments, including the example embodiments shown in FIGS. 4 to 8, in the example embodiments shown in FIG. 11, a video stream based on the whole low-resolution image data and a video stream based on partial high-resolution image data are generated based on ultra-high-resolution image data output from only one image sensor. Accordingly, the issue that ultra-high-resolution image data fail to be provided to the user in real time every frame due to the limitation on a bandwidth of the CSI may be solved.

Figure 12:
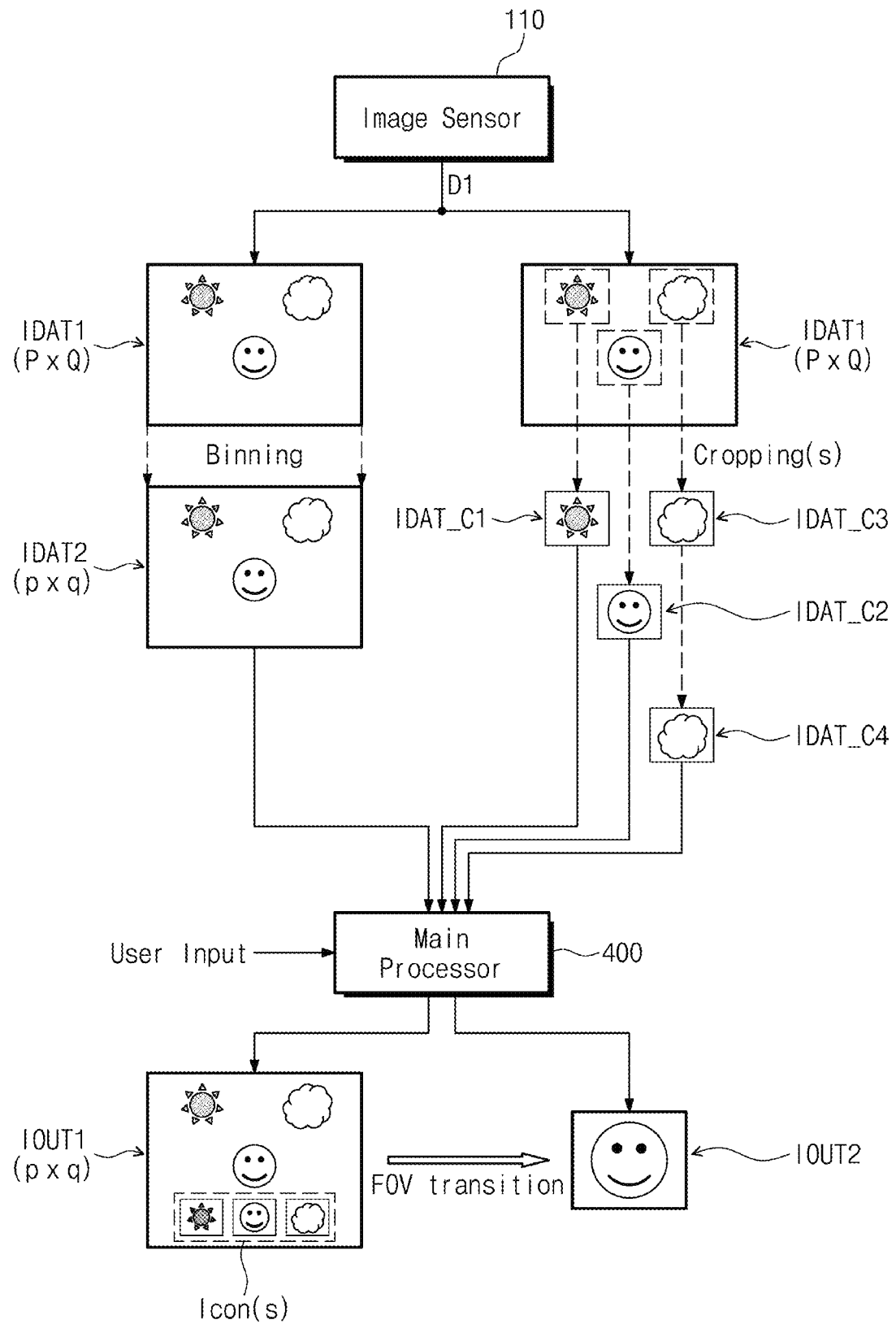
FIG. 12 conceptually illustrates an operation of an image signal processor of FIG. 1 according to some example embodiments of the inventive concepts.

FIG. 12 conceptually illustrates an operation of the image signal processor 130 of FIG. 1 according to some example embodiments of the inventive concepts.

The example embodiments shown in FIG. 12 are mostly similar to the example embodiments shown in FIG. 11, and thus, additional description will be omitted to avoid redundancy. However, even though image data are processed according to the method described with reference to FIG. 11, the bandwidth of the CSI for video streams that are transmitted from the image signal processor 130 to the main processor 400 may not be sufficient. In this case, additional processing may be performed in consideration of the bandwidth of the CSI. Accordingly, the image signal processor 130 may be configured to generate a cropped image data based on a bandwidth of the CSI (e.g., may generate the cropped image to not be too large for transmission due to the bandwidth of the CSI).

The main processor 400 may first calculate information about an ROI from image data of a first frame, and then may in advance determine whether image data are capable of being smoothly transmitted from the image signal processor 130 to the main processor 400, with reference to the calculated information of the ROI. When it is determined that the transmission of image data is not smooth, the main processor 400 may transmit, to the image signal processor 130, information indicating that there is required additional processing (e.g., binning), in addition to the cropping of an area corresponding to the ROI of the first image data IDAT1.

The image signal processor 130 may perform binning on at least one of the cropped image data IDAT_C1, IDAT_C2, or IDAT_C3, based on the information additionally received from the main processor 400. For example, the image signal processor 130 may perform binning on the cropped image data IDAT_C3 corresponding to the third ROI R3 and thus may generate the image data IDAT_C4. The image signal processor 130 may transmit, to the main processor 400, the first image data IDAT1, the cropped image data IDAT_C1 and IDAT_C2, and the image data IDAT_C4 obtained through cropping and binning within the bandwidth of the CSI every frame. Accordingly, the image signal processor 130 may be configured to generate a cropped image data based on a bandwidth of the CSI (e.g., may generate the cropped image to not be too large for transmission due to the bandwidth of the CSI).

Figure 13:
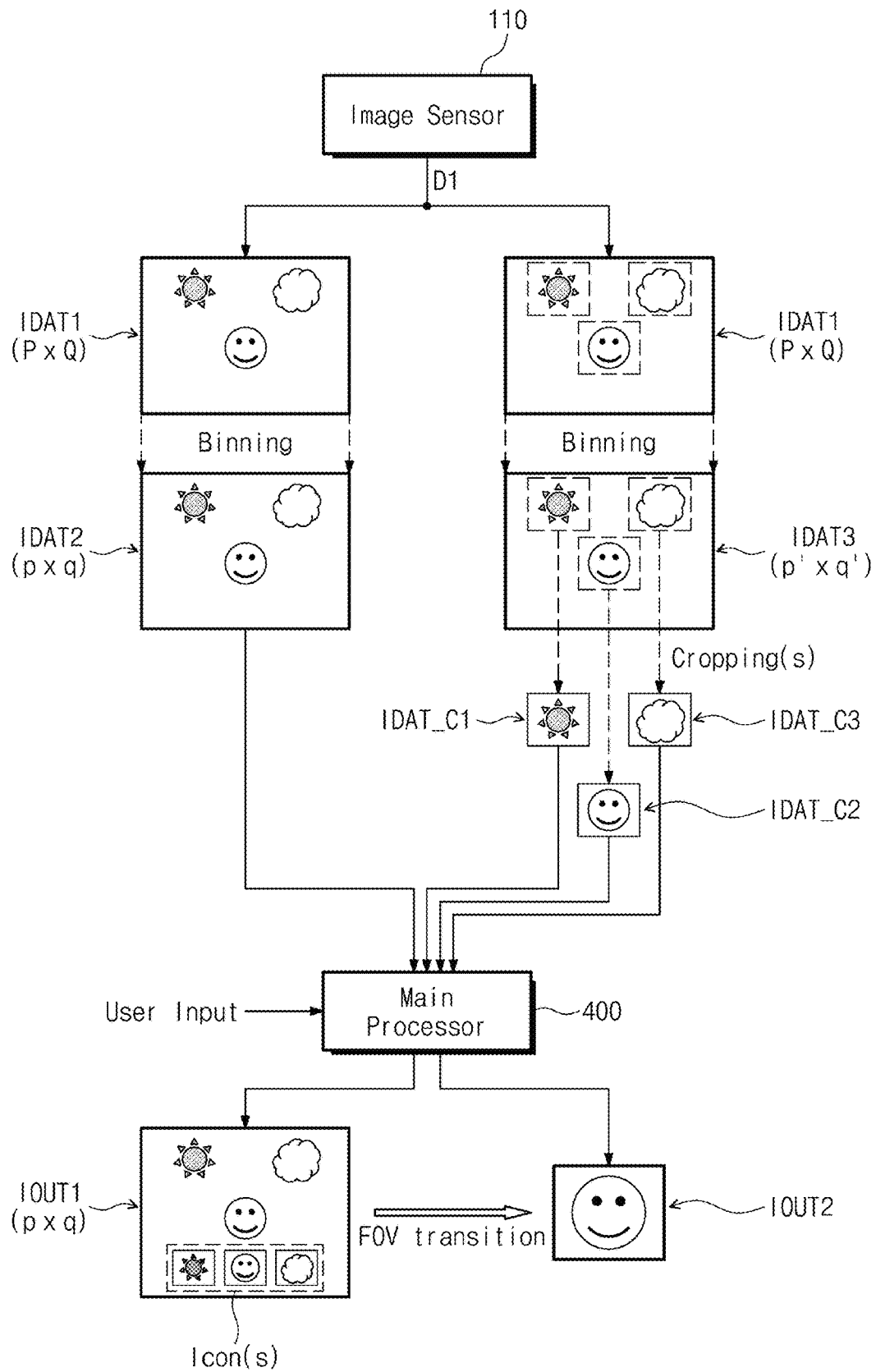
FIG. 13 conceptually illustrates an operation of an image signal processor of FIG. 10 according to some example embodiments of the inventive concepts.

FIG. 13 conceptually illustrates an operation of the image signal processor 130 of FIG. 10 according to some example embodiments of the inventive concepts.

The example embodiments shown in FIG. 13 may be carried out when there is a need to perform a plurality of binning operations on cropped image data corresponding to an ROI in the example embodiments shown in FIG. 12. For example, in the example embodiments shown in FIG. 12, in the case where there is a need to perform additional binning on all cropped image data due to the limitation on the bandwidth of the CSI, the number of additional binning operations may increase, thereby causing a delay of the transmission of image data. Accordingly, it may be more efficient to first perform binning on the first image data IDAT1 before areas corresponding to ROIs are cropped from the first image data IDAT1.

In some example embodiments, to obtain the whole low-resolution image data, the image signal processor 130 may perform first binning on the first image data IDAT1 of an ultra-high resolution. As a result of the binning, the second image data IDAT2 having a lower resolution (i.e., "p×q") than the first image data IDAT1 may be obtained.

In some example embodiments, to obtain partial high-resolution image data, the image signal processor 130 may perform second binning on the first image data IDAT1 of the ultra-high resolution. As a result of the binning, the third image data IDAT3 having a lower resolution (i.e., p'×q') than the first image data IDAT1 may be obtained. For example, the resolution (p'×q') of the third image data IDAT3 may be greater than the resolution (p×q) of the second image data IDAT2. The reason is that the third image data IDAT3 is associated with obtaining a partial image of a high resolution.

The image signal processor 130 may crop areas associated with ROIs from the third image data IDAT3, with reference to pieces of information about the ROIs received from the main processor 400. As a result, the first cropped image data IDAT_C1 associated with the first ROI R1, the second cropped image data IDAT_C2 associated with the second ROI R2, and the third cropped image data IDAT_C3 associated with the third ROI R3 may be generated. The image signal processor 130 may transmit the second image data IDAT2 and the cropped image data IDAT_C1, IDAT_C2, and IDAT_C3 to the main processor 400 in real time.

Figure 14:
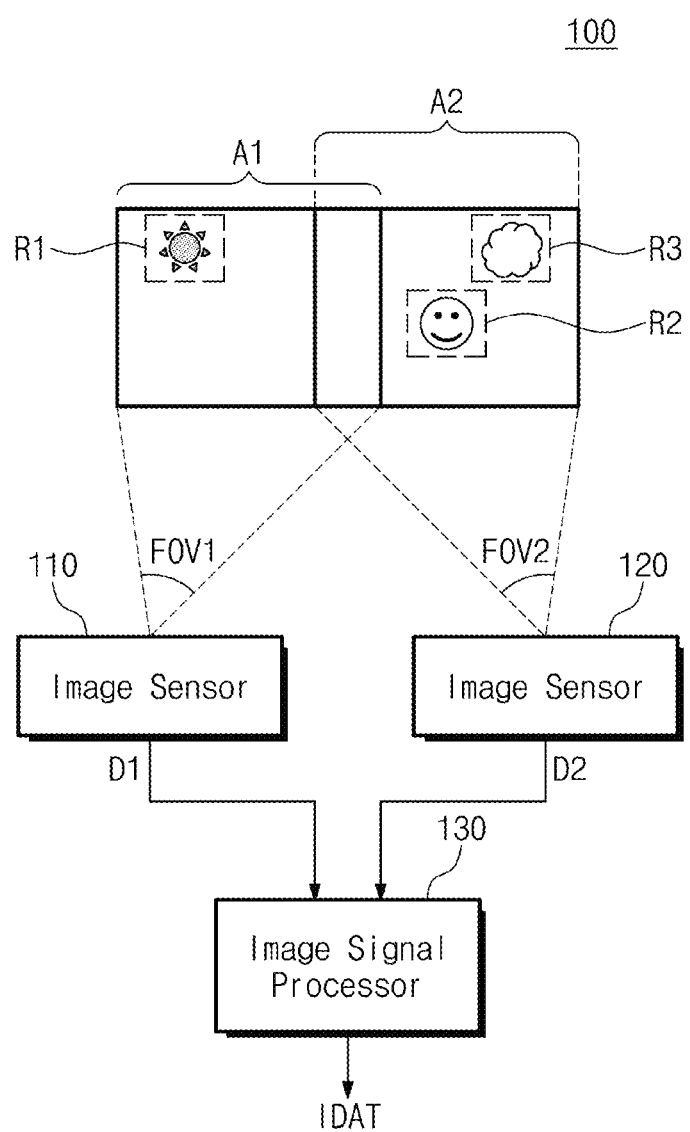
FIG. 14 is a block diagram for describing operations of image sensors of FIG. 1 according to some example embodiments of the inventive concepts.

FIG. 14 is a block diagram for describing operations of image sensors of FIG. 1 according to some example embodiments of the inventive concepts.

Referring to FIGS. 1 and 14, the first image sensor 110 may photograph a first area A1 of an object in the first field of view FOV1, and the second image sensor 120 may photograph a second area A2 of the object in the second field of view FOV2. For example, the second field of view FOV2 may be the same as or different from the first field of view FOV1. The image sensors 110 and 120 may operate to photograph an image of a relatively wide field of view, and the lenses 101 and 102 may be a wide lens or an ultra-wide lens. A resolution of a pixel sensor array of the first image sensor 110 and a resolution of a pixel sensor array of the second image sensor 120 may be the same or different. However, in the example embodiments shown in FIG. 14, it is assumed that the first field of view FOV1 and the second field of view FOV2 are the same and the resolution of the pixel sensor array of the first image sensor 110 and the resolution of the pixel sensor array of the second image sensor 120 are the same.

The image signal processor 130 may generate partial high-resolution image data associated with the first ROI R1 and the whole low-resolution image data, based on the first signal D1. The image signal processor 130 may generate partial high-resolution image data respectively associated with the second ROI R2 and the third ROI R3 and the whole low-resolution image data, based on the second signal D2.

The image signal processor 130 may transmit, to the main processor 400, the whole low-resolution image data based on the first signal D1, the whole low-resolution image data based on the second signal D2, and the partial high-resolution image data based on the signals D1 and D2. The image data IDAT thus transmitted may be used for the main processor 400 to obtain an image of a third field of view FOV3 wider than the first field of view FOV1 and the second field of view FOV2 and a partial ultra-high-resolution image associated with a specific object. As a result, within a limited bandwidth of the CSI, a transition of a field of view from the whole low-resolution image, which has a wider field of view than that of each of the image sensors 110 and 120, to a partial ultra-high-resolution image may be implemented in real time.

Figure 15:
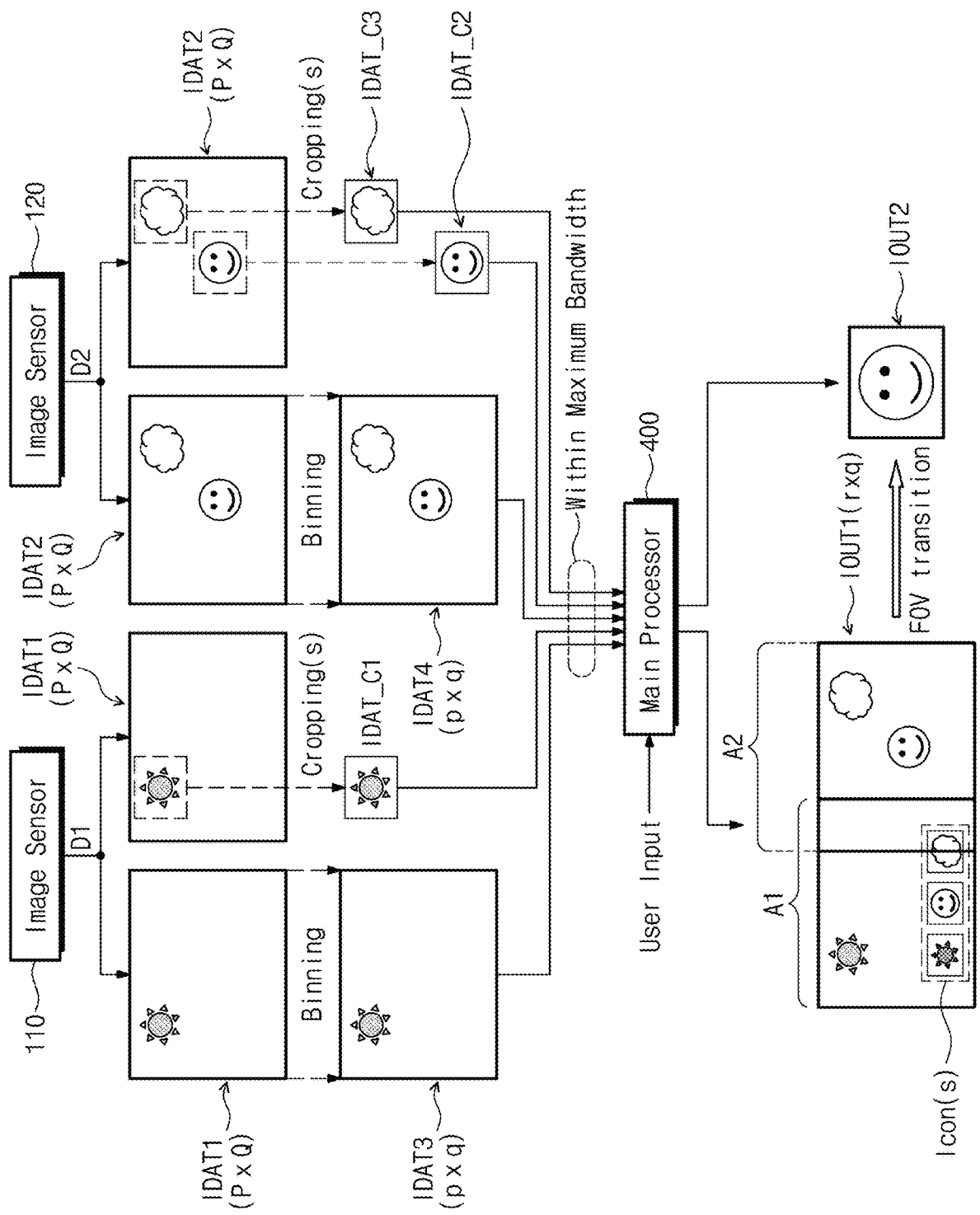
FIG. 15 conceptually illustrates an operation of an image signal processor of FIG. 14 according to some example embodiments of the inventive concepts.

FIG. 15 conceptually illustrates an operation of the image signal processor 130 of FIG. 14 according to some example embodiments of the inventive concepts.

How to process two image data photographed in the same field of view will be described with reference to FIGS. 1, 14, and 15.

The first image sensor 110 may photograph the first area A1 including the first ROI R1 in the first field of view FOV1 to generate the first image data IDAT1, and the second image sensor 120 may photograph the second area A2 including the ROIs R2 and R3 in the second field of view FOV2 to generate the second image data IDAT2.

The image signal processor 130 may perform binning on the first image data IDAT1 to generate the third image data IDAT3 of a low resolution and may perform binning on the second image data IDAT2 to generate the fourth image data IDAT4 of a low resolution. Accordingly, the image signal processor 130 may generate third image data IDAT3 based on performing binning on the first image data IDAT1 and generate fourth image data IDAT based on performing binning on the second image data IDAT2. For example, the third image data IDAT3 and the fourth image data IDAT4 may have the same resolution, that is, "p×q", not limited thereto.

The image signal processor 130 may crop an area corresponding to the first ROI R1 of the first image data IDAT1 and may crop areas corresponding to the ROIs R2 and R3 of the second image data IDAT2. To perform the above cropping, the image signal processor 130 may refer to information about ROIs that the main processor 400 calculates from image data of a previous frame. As a result of the cropping, the first cropped image data IDAT_C1 may be generated from the first image data IDAT1, and the second cropped image data IDAT_C2 and the third cropped image data IDAT_C3 may be generated from the second image data IDAT2. Restated, the image signal processor 130 may generate first cropped image data (e.g., IDAT_C1) based on cropping a first region of interest (e.g., R1) from the first image data IDAT1 and may generate second cropped image data (e.g., IDAT_C2 and/or IDAT_C3) based on cropping a second region of interest (e.g., R2 and/or R3) from the second image data (e.g., IDAT2). The image signal processor 130 may transmit the image data IDAT3, IDAT4, IDAT_C1, IDAT_C2, and IDAT_C3 to the main processor 400 within the bandwidth of the CSI. Accordingly, the image signal processor 130 may be configured to generate a cropped image data based on a bandwidth of the CSI (e.g., may generate the cropped image to not be too large for transmission due to the bandwidth of the CSI).

The main processor 400 may merge the third image data IDAT3 having the first field of view FOV1 (and which is based on the first image data IDAT1) and the fourth image data IDAT4 having the second field of view FOV2 (and which is based on the second image data IDAT2) to generate image data having a wide field of view. Next, the main processor 400 may generate the first video stream IOUT1 based on the generated image data. Accordingly, the main processor 400 may generate a first video stream IOUT1 based on the first image data and the second image data IDAT1 and IDAT2. The main processor 400 may generate high-resolution video streams respectively based on the cropped image data IDAT_C1, IDAT_C2, and IDAT_C3. Accordingly, the main processor 400 may generate a second video stream IOUT2 based on the first cropped image data (e.g., IDAT_C1) and a third video stream based on the second cropped image data (e.g., R2 and/or R3).

The main processor 400 may provide the first video stream IOUT1 to the user through the display device 300 (e.g., output the first video stream IOUT1 to the display device 300). In response to a user input, the main processor 400 may stop providing the first video stream IOUT1 and may provide the second video stream IOUT2 corresponding to one of the ROIs R1, R2, or R3 to the user. That is, a field of view may transition from the whole low-resolution image to a partial high-resolution image. For example, the main processor 400 may stop outputting the first video stream IOUT1 to the display device 300 and initiate outputting one of the second video stream or the third video stream to the display device 300 (e.g., switch from outputting the first video stream to outputting one of the second video stream or the third video stream) in response to receiving a user input command. The field of view of the first video stream IOUT1 may be greater than the first field of view FOV1 and greater than the second field of view FOV2.

In some example embodiments, including the example embodiments described with reference to FIG. 12, binning may be further performed on the cropped image data IDAT_C1, IDAT_C2, and IDAT_C3 in consideration of the bandwidth between the image signal processor 130 and the main processor 400. In addition, some example embodiments where an image is generated by merging data from two image sensors 110 and 120 is disclosed as an example, but an image of a wider field of view may be generated by merging data from three or more image sensors.

Figure 16:
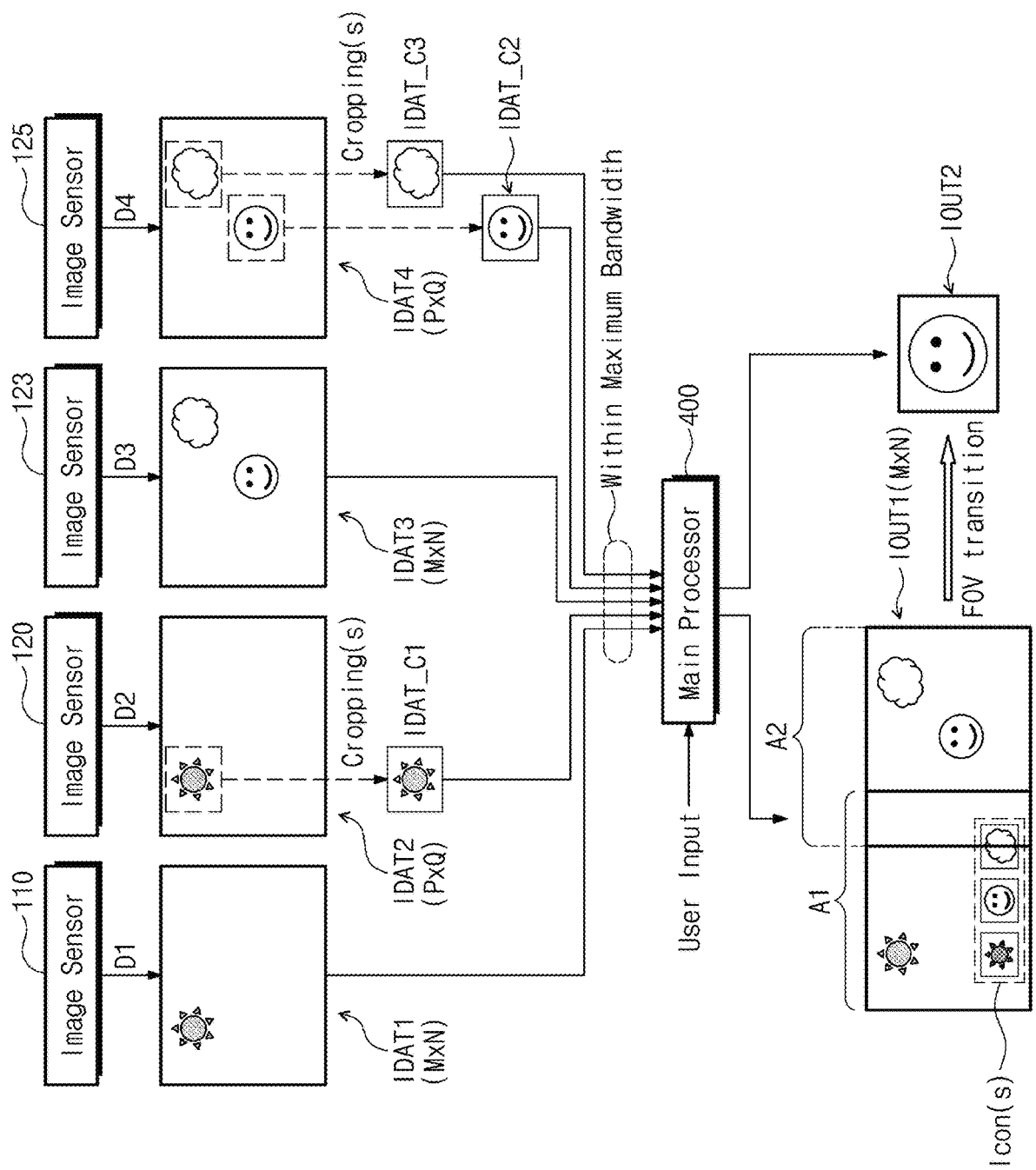
FIG. 16 conceptually illustrates an operation of a modified configuration of an image signal processor of FIG. 14 according to some example embodiments of the inventive concepts.

FIG. 16 conceptually illustrates an operation of a modified configuration of the image signal processor 130 of FIG. 14 according to some example embodiments of the inventive concepts. In detail, the example embodiments shown in FIG. 16 relates to processing of image data photographed by using four image sensors.

Referring to FIGS. 1, 14, and 16, a first image sensor 110 and a second image sensor 120 may photograph the first area A1 including the first ROI R1 in the first field of view FOV1 and may respectively generate first image data IDAT1 and second image data IDAT2. A third image sensor 123 and a fourth image sensor 125 may photograph the second area A2 including the ROIs R2 and R3 in the second field of view FOV2 and may respectively generate third image data IDAT3 and fourth image data IDAT4.

In some example embodiments, a resolution of an active pixel sensor array of the first image sensor 110 may be lower than a resolution of an active pixel sensor array of the second image sensor 120. A resolution of an active pixel sensor array of the third image sensor 123 may be lower than a resolution of an active pixel sensor array of the fourth image sensor 125. Accordingly, a resolution (i.e., "M×N") of the first image data IDAT1 may be lower than a resolution (i.e., "P×Q") of the second image data IDAT2, and a resolution (i.e., "M×N") of the third image data IDAT3 may be lower than a resolution (i.e., "P×Q") of the fourth image data IDAT4. In some example embodiments, it is assumed that the resolutions of the first image data IDAT1 and the third image data IDAT3 are the same and resolutions of the second image data IDAT2 and the fourth image data IDAT4 are the same, not limited thereto.

The image signal processor 130 may crop an area corresponding to the first ROI R1 of the second image data IDAT2 and may crop areas corresponding to the ROIs R2 and R3 of the fourth image data IDAT4. To perform the above cropping, the image signal processor 130 may refer to information about ROIs that the main processor 400 calculates from image data of a previous frame. As a result of the cropping, the first cropped image data IDAT_C1 may be generated from the second image data IDAT2, and the second cropped image data IDAT_C2 and the third cropped image data IDAT_C3 may be generated from the fourth image data IDAT4. The image signal processor 130 may transmit the image data IDAT1, IDAT3, IDAT_C1, IDAT_C2, and IDAT_C3 to the main processor 400 within the bandwidth of the CSI.

The main processor 400 may merge the first image data IDAT1 having the first field of view FOV1 and the third image data IDAT3 having the second field of view FOV2 to generate image data having a wide field of view. Next, the main processor 400 may generate the first video stream IOUT1 based on the generated image data. The main processor 400 may generate high-resolution video streams respectively based on the cropped image data IDAT_C1, IDAT_C2, and IDAT_C3. The main processor 400 may provide the first video stream IOUT1 to the user through the display device 300. In response to a user input, the main processor 400 may provide the second video stream IOUT2 corresponding to one of the ROIs R1, R2, or R3 to the user.

In some example embodiments, as in the embodiments described with reference to FIGS. 5 to 7, additional processing may be performed on at least one of the image data IDAT1 and/or IDAT3 and the cropped image data IDAT_C1, IDAT_C2, and IDAT_C3 in consideration of the bandwidth between the image signal processor 130 and the main processor 400. For example, as in the example embodiments shown in FIG. 5, the image signal processor 130 may perform binning on at least one of the cropped image data IDAT_C1, IDAT_C2, or IDAT_C3. In some example embodiments, as in the example embodiments shown in FIG. 6, the image signal processor 130 may perform additional binning on at least one of the image data IDAT1 or IDAT3. In some example embodiments, including the example embodiments shown in FIG. 7, the image signal processor 130 may perform additional binning on at least one of the image data IDAT2 or IDAT4.

Figure 17:
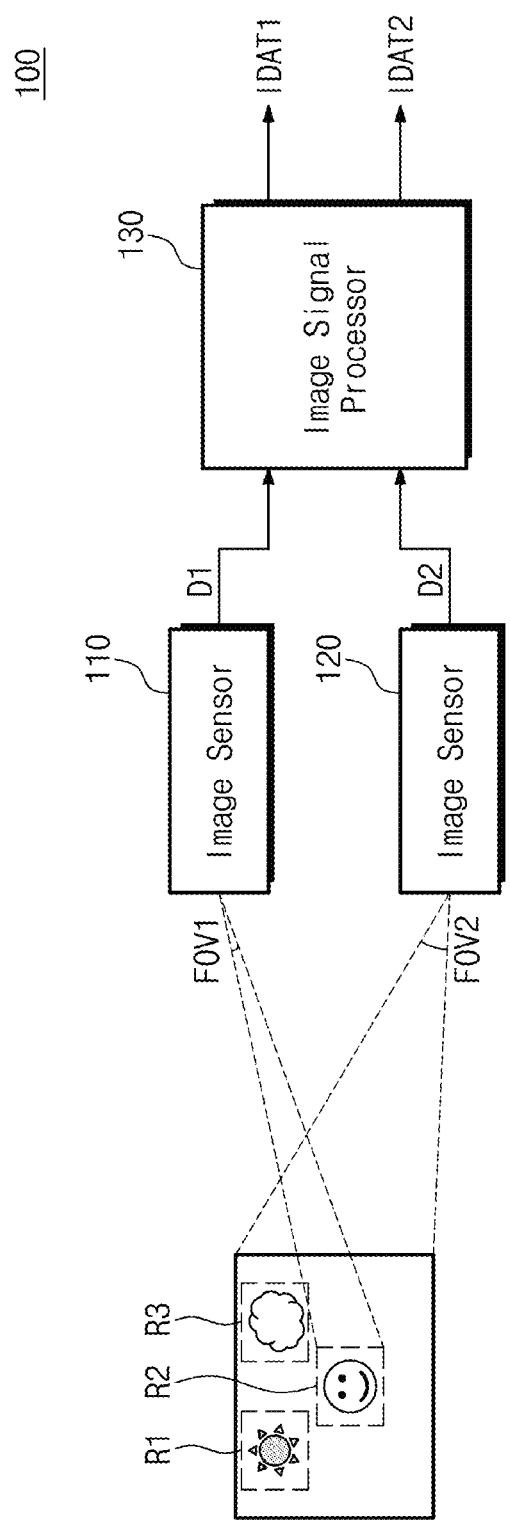
FIG. 17 is a block diagram for describing operations of image sensors of FIG. 1 according to some example embodiments of the inventive concepts.

FIG. 17 is a block diagram for describing operations of image sensors of FIG. 1 according to some example embodiments of the inventive concepts.

Referring to FIGS. 1 and 17, the first image sensor 110 may photograph an object in a first field of view FOV1, and the second image sensor 120 may photograph the object in a second field of view FOV2 greater than the first field of view FOV1. Accordingly, the first image sensor 110 may operate to photograph an image of a relatively narrow field of view, and the second image sensor 120 may operate to photograph an image of a relatively wide field of view. For example, the first lens 101 may be a tele lens, and the second lens 102 may be a wide lens or an ultra-wide lens.

The first image sensor 110 may receive a light reflected by an object in an area corresponding to the first field of view FOV1 and may generate the first signal D1. The second image sensor 120 may receive a light reflected by an object in an area corresponding to the second field of view FOV2 and may generate the second signal D2. For example, a resolution of a pixel sensor array of the first image sensor 110 and a resolution of a pixel sensor array of the second image sensor 120 may be the same or different. Below, it is assumed that the resolution of the pixel sensor array of the first image sensor 110 and the resolution of the pixel sensor array of the second image sensor 120 are the same.

The image signal processor 130 may generate the first image data IDAT1 based on the first signal D1 and may generate the second image data IDAT2 based on the second signal D2. For example, the image signal processor 130 may crop an area corresponding to a specific ROI among ROIs R1, R2, and R3 from image data that are based on the second signal D2, and may output the cropped images as the second image data IDAT2.

Figure 18:
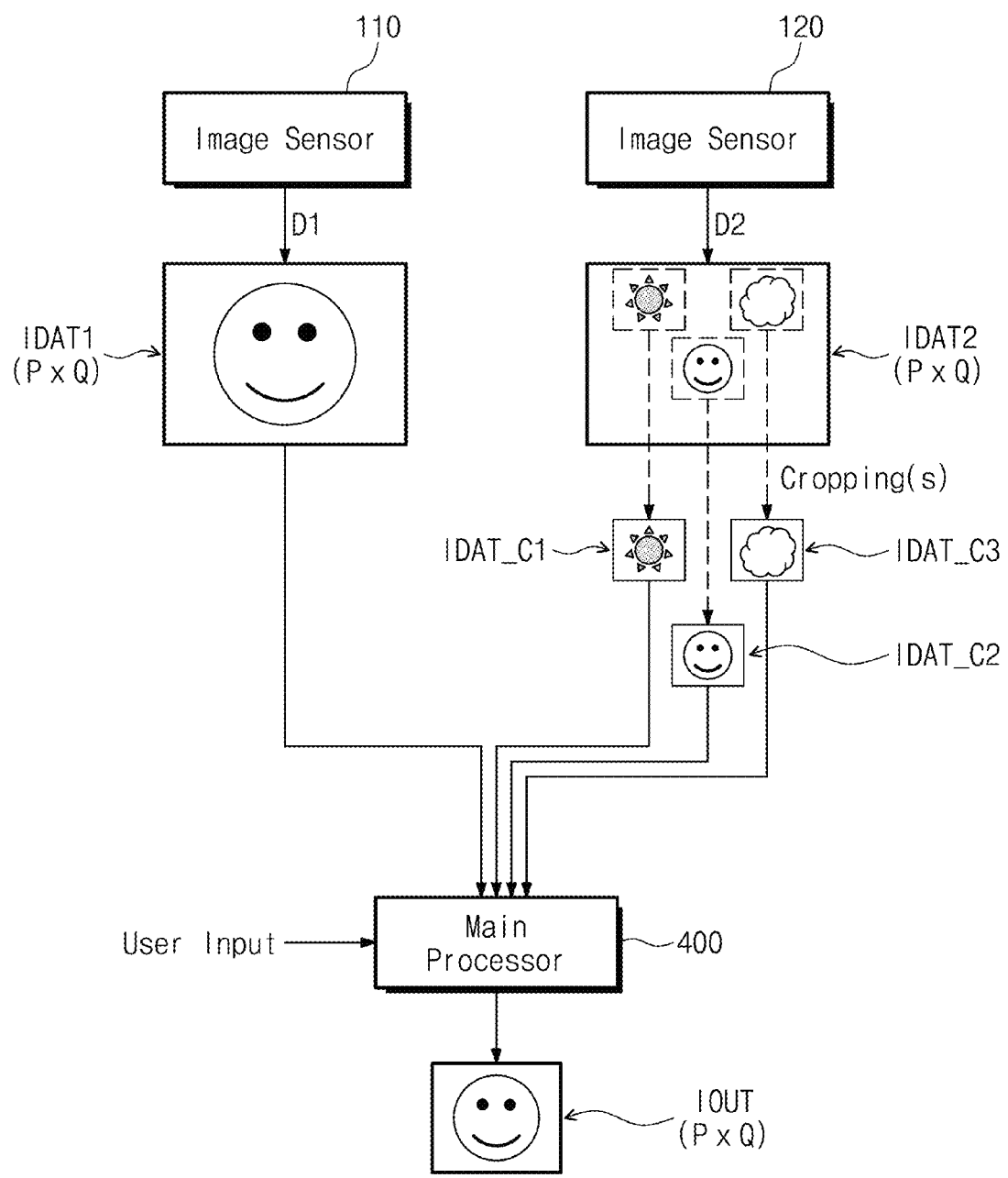
FIG. 18 conceptually illustrates an operation of an image signal processor of FIG. 17 according to some example embodiments of the inventive concepts.

FIG. 18 conceptually illustrates an operation of the image signal processor 130 of FIG. 17 according to some example embodiments of the inventive concepts.

How to process two image data photographed in different FOVs from each other will be described with reference to FIGS. 1, 17, and 18. The image signal processor 130 may obtain the first image data IDAT1 based on the first signal D1 received from the first image sensor 110 and may obtain the second image data IDAT2 based on the second signal D2 received from the second image sensor 120. As described above, the first signal D1 and the second signal D2 may be associated with images having the same resolution.

In some example embodiments, each of the first image sensor 110 and the second image sensor 120 may include a pixel array composed of "Q" rows each including "P" pixels. Accordingly, the resolutions of the first image data IDAT1 and the second image data IDAT2 may be "P×Q". Because the first image sensor 110 photographs an object by using a telephoto lens, a size of an ROI in image data may be relatively large; because the second image sensor 120 photographs an object by using a wide lens or a ultra-wide lens, a size of an ROI in image data may be relatively small.

In some example embodiments, the image signal processor 130 may output the first image data IDAT1 to the main processor 400 without performing special processing on the first image data IDAT1. The image signal processor 130 may crop an area associated with an ROI from the second image data IDAT2, with reference to information about the ROI received from the main processor 400.

In some example embodiments, as described above, the image signal processor 130 may perform cropping on all ROIs on the second image data IDAT2. The cropped image data IDAT_C1, IDAT_C2, and IDAT_C3 associated with the ROIs of the second image data IDAT2 may be generated as a result of the above cropping. In some example embodiments, the image signal processor 130 may crop only an area of the second image data IDAT2, which is associated with the second ROI R2 photographed by the first image sensor 110. The cropped image data IDAT_C2 associated with the second ROI R2 of the second image data IDAT2 may be generated as a result of the above cropping.

In some example embodiments, to merge the first image data IDAT1 and the cropped image data IDAT_C2, the image signal processor 130 may perform cropping such that an aspect ratio of the image data IDAT_C2 cropped from the second image data IDAT2 and an aspect ratio of the first image data IDAT are the same. Afterwards, the image signal processor 130 may transmit the first image data IDAT1 and the cropped image data to the main processor 400.

Afterwards, the main processor 400 may merge the first image data IDAT and the image data IDAT_C2 corresponding to the second ROI R2 to generate an HDR-processed video stream TOUT. Even though the first image data IDAT1 and the cropped image data IDAT_C2 are based on the signal D1 output from the first image sensor 110, because the first image data IDAT1 and the cropped image data IDAT_C2 have different resolutions, dynamic ranges of the first image data IDAT1 and the cropped image data IDAT_C2 may be different. Accordingly, partial ultra-high-resolution image data having a wider dynamic range may be obtained by merging the image data IDAT1 and IDAT_C2 having different dynamic ranges.

Figure 19:
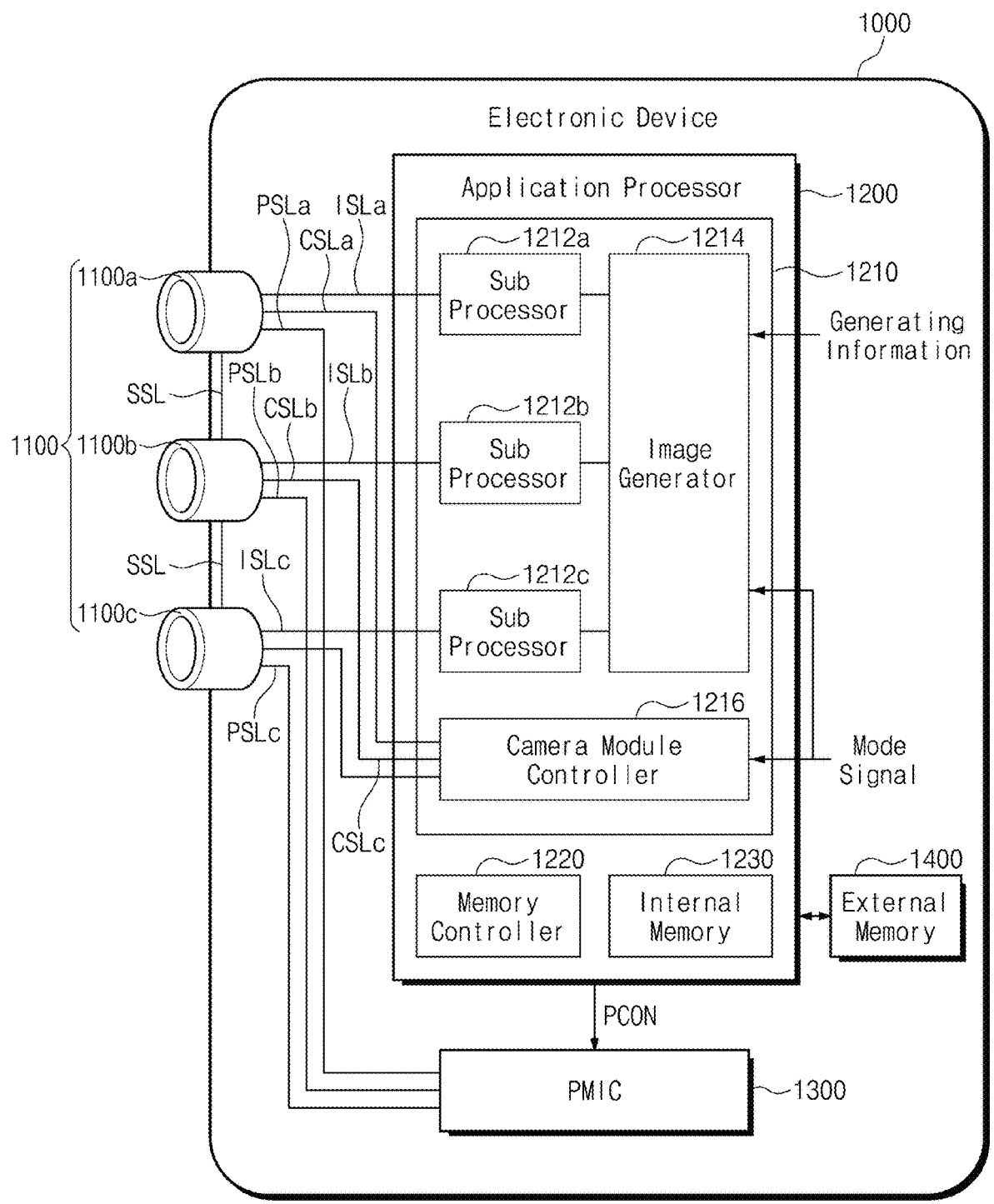
FIG. 19 illustrates a configuration of an electronic device including a camera module in which an image processing device of the inventive concepts are implemented according to some example embodiments of the inventive concepts.
Figure 20:
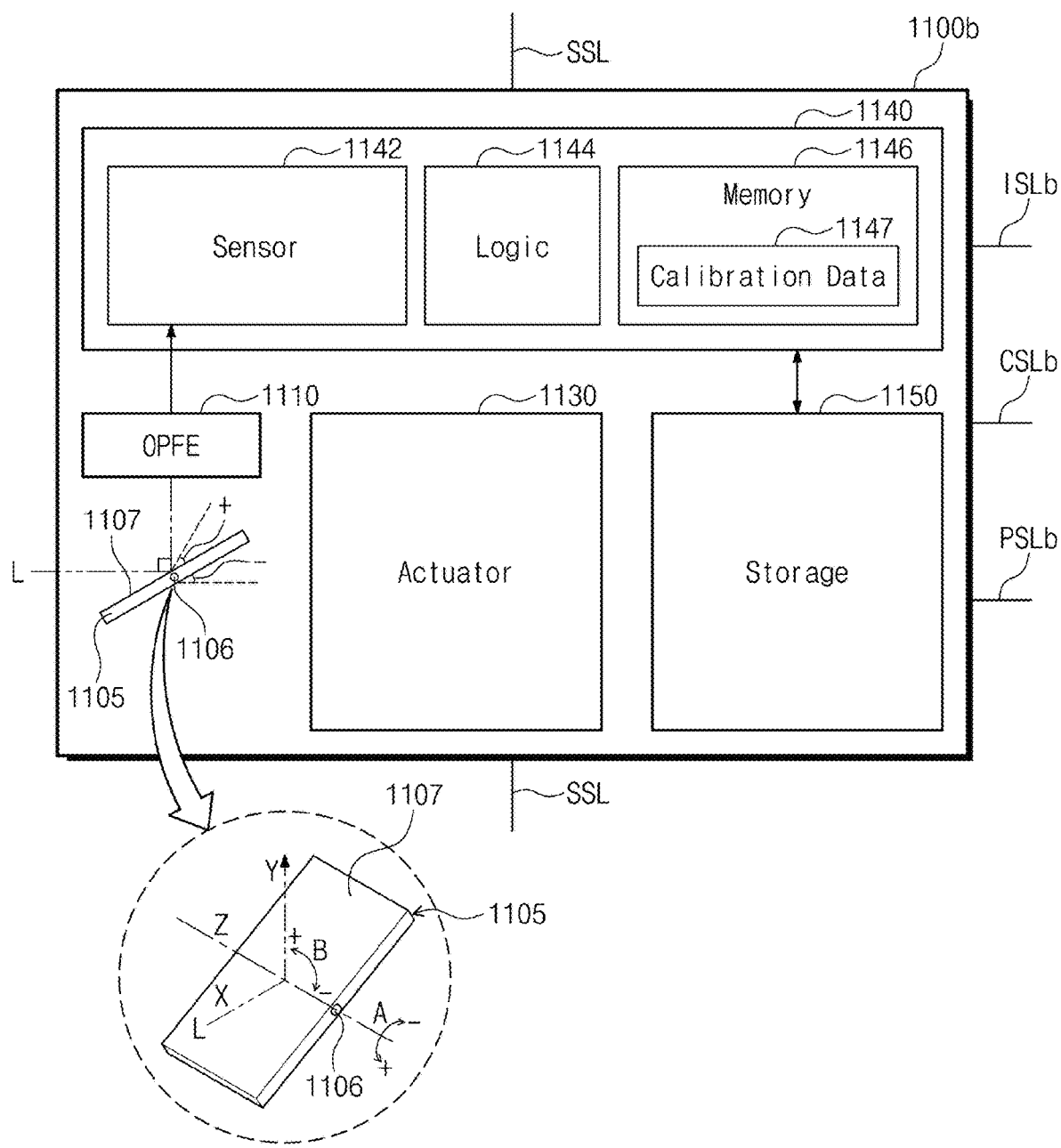
FIG. 20 illustrates a configuration of a camera module of FIG. 19 according to some example embodiments of the inventive concepts.

FIG. 19 illustrates a configuration of an electronic device including a camera module in which an image processing device of the inventive concepts are implemented according to some example embodiments of the inventive concepts. FIG. 20 illustrates a configuration of a camera module of FIG. 19 according to some example embodiments of the inventive concepts.

Referring to FIG. 19, an electronic device 1000 may include a camera module group 1100, an application processor 1200, a PMIC 1300, and an external memory 1400.

The camera module group 1100 may include a plurality of camera modules 1100a, 1100b, and 1100c. An electronic device including three camera modules 1100a, 1100b, and 1100c is illustrated in FIG. 19 by way of example, not limited thereto. In some example embodiments, the camera module group 1100 may be modified to include only two camera modules. Also, in some example embodiments, the camera module group 1100 may be modified to include "n" camera modules (n being a natural number of 4 or more).

Below, a detailed configuration of the camera module 1100*b* will be more fully described with reference to FIG. 20, but the following description may be equally applied to the remaining camera modules 1100*a* and 1100*c*.

Referring to FIG. 20, the camera module 1100*b* may include a prism 1105, an optical path folding element (OPFE) 1110, an actuator 1130, an image sensing device 1140, and storage 1150.

The prism 1105 may include a reflecting plane 1107 of a light reflecting material and may change a path of a light "L" incident from the outside.

In some example embodiments, the prism 1105 may change a path of the light "L" incident in a first direction "X" to a second direction "Y" perpendicular to the first direction "X". Also, the prism 1105 may change the path of the light "L" incident in the first direction "X" to the second direction "Y" perpendicular to the first direction "X" by rotating the reflecting plane 1107 of the light reflecting material in direction "A" about a central axis 1106 or rotating the central axis 1106 in direction "B". In this case, the OPFE 1110 may move in a third direction "Z" perpendicular to the first direction "X" and the second direction "Y".

In some example embodiments, as illustrated, a maximum rotation angle of the prism 1105 in direction "A" may be equal to or smaller than 15 degrees in a positive A direction and may be greater than 15 degrees in a negative A direction, not limited thereto.

In some example embodiments, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In some example embodiments, the prism 1105 may move the reflecting plane 1107 of the light reflecting material in the third direction (e.g., a Z direction) parallel to a direction in which the central axis 1106 extends.

The OPFE 1110 may include optical lenses composed of "m" groups (m being a natural number), for example. Here, "m" lens may move in the second direction "Y" to change an optical zoom ratio of the camera module 1100*b*. For example, when a default optical zoom ratio of the camera module 1100*b* is "Z", the optical zoom ratio of the camera module 1100*b* may be changed to an optical zoom ratio of 3Z, 5Z, or 5Z or more by moving "m" optical lens included in the OPFE 1110.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target by using the light "L" provided through an optical lens. The control logic 1144 may control overall operations of the camera module 1100*b* and may include the image signal processor 130 described above. For example, the control logic 1144 may control an operation of the camera module 1100*b* based on a control signal provided through a control signal line CSLb.

The memory 1146 may store information, which is necessary for an operation of the camera module 1100*b*, such as calibration data 1147. The calibration data 1147 may include information necessary for the camera module 1100*b* to generate image data by using the light "L" provided from the outside. The calibration data 1147 may include, for example, information about the degree of rotation described above, information about a focal length, information about an optical axis, etc. In the case where the camera module 1100*b* is implemented in the form of a multi-state camera in which a focal length varies depending on a location of an optical lens, the calibration data 1147 may include a focal length value for each location (or state) of the optical lens and information about auto focusing. The memory 1146 may store information about an ROI necessary for a transition of a field of view of the inventive concepts.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In some example embodiments, the storage 1150 may be implemented with an electrically erasable programmable read only memory (EEPROM), not limited thereto.

Referring to FIGS. 19 and 20 together, in some example embodiments, each of the plurality of camera modules 1100*a*, 1100*b*, and 1100*c* may include the actuator 1130. As such, the same calibration data 1147 or different calibration data 1147 may be included in the plurality of camera modules 1100*a*, 1100*b*, and 1100*c* depending on operations of the actuators 1130 therein.

In some example embodiments, one camera module (e.g., 1100*b*) among the plurality of camera modules 1100*a*, 1100*b*, and 1100*c* may be a folded lens shape of camera module in which the prism 1105 and the OPFE 1110 described above are included, and the remaining camera modules (e.g., 1100*a* and 1100*c*) may be a vertical shape of camera module in which the prism 1105 and the OPFE 1110 described above are not included, not limited thereto.

In some example embodiments, one camera module (e.g., 1100*c*) among the plurality of camera modules 1100*a*, 1100*b*, and 1100*c* may be, for example, a vertical shape of depth camera extracting depth information by using an infrared ray (IR). In this case, the application processor 1200 may merge image data provided from the depth camera and image data provided from any other camera module (e.g., 1100*a* or 1100*b*) and may generate a three-dimensional (3D) depth image.

In some example embodiments, at least two camera modules (e.g., 1100*a* and 1100*b*) among the plurality of camera modules 1100*a*, 1100*b*, and 1100*c* may have different FOVs from each other. In this case, the at least two camera modules (e.g., 1100*a* and 1100*b*) among the plurality of camera modules 1100*a*, 1100*b*, and 1100*c* may include different optical lens, not limited thereto.

Also, in some example embodiments, fields of view of the plurality of camera modules 1100*a*, 1100*b*, and 1100*c* may be different. In this case, the plurality of camera modules 1100*a*, 1100*b*, and 1100*c* may include different optical lens, not limited thereto.

In some example embodiments, the plurality of camera modules 1100*a*, 1100*b*, and 1100*c* may be disposed to be physically separated from each other. That is, the plurality of camera modules 1100*a*, 1100*b*, and 1100*c* may not use a sensing area of one image sensor 1142, but the plurality of camera modules 1100*a*, 1100*b*, and 1100*c* may include independent image sensors 1142 therein, respectively.

Returning to FIG. 19, the application processor 1200 may include an image processing device 1210, a memory controller 1220, and an internal memory 1230. The application processor 1200 may be implemented to be separated from the plurality of camera modules 1100*a*, 1100*b*, and 1100*c*.

For example, the application processor 1200 and the plurality of camera modules 1100a, 1100b, and 1100c may be implemented with separate semiconductor chips.

The image processing device 1210 may include a plurality of sub image processors 1212a, 1212b, and 1212c, an image generator 1214, and a camera module controller 1216. The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), not limited thereto.

Meanwhile, in some example embodiments, one sub image processor may be disposed to correspond to a plurality of camera modules, also referred to herein as cameras. For example, the sub image processor 1212a and the sub image processor 1212c may be integrally implemented, not separated from each other as illustrated in FIG. 19; in this case, one of the pieces of image data respectively provided from the camera module 1100a and/or the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on image generating information Generating Information or a mode signal Mode Signal.

In detail, the image generator 1214 may generate the output image by merging at least a portion of the image data respectively generated from the camera modules 1100a, 1100b, and 1100c having different FOVs from each other, depending on the image generating information Generating Information or the mode signal. Also, the image generator 1214 may generate the output image by selecting one of the image data respectively generated from the camera modules 1100a, 1100b, and/or 1100c having different FOVs from each other, depending on the image generating information Generating Information or the mode signal.

In some example embodiments, the image generating information Generating Information may include a zoom signal or a zoom factor. Also, in some example embodiments, the mode signal may be, for example, a signal based on a mode selected from a user.

In the case where the image generating information Generating Information is the zoom signal (or zoom factor) and the camera modules 1100a, 1100b, and 1100c have different visual fields (or fields of view), the image generator 1214 may perform different operations depending on a kind of the zoom signal. For example, in the case where the zoom signal is a first signal, the image generator 1214 may merge the image data output from the camera module 1100a and the image data output from the camera module 1100c and may generate the output image by using the merged image signal and the image data output from the camera module 1100b that is not used in the merging operation.

In the case where the zoom signal is a second signal different from the first signal, without the image data merging operation, the image generator 1214 may select one of the image data respectively output from the camera modules 1100a, 1100b, and/or 1100c and may output the selected image data as the output image, not limited thereto. A way to process image data may be modified without limitation if necessary.

In some example embodiments, the image generator 1214 may generate merged image data having an increased dynamic range by receiving a plurality of image data of different exposure times from at least one of the plurality of sub image processors 1212a, 1212b, and/or 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, or 1100c (camera modules being referred to interchangeably herein as cameras) may be designated as a master camera (e.g., 1100b) depending on the image generating information Generating Information including a zoom signal or the mode signal, and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave may be changed depending on the zoom factor or an operating mode signal. For example, in the case where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In some example embodiments, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In some example embodiments, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and a second operating mode with regard to a sensing speed.

In the first operating mode, the plurality of camera modules 1100a, 1100b, and 1100c may generate image signals at a first speed (e.g., may generate image signals of a first frame rate), may encode the image signals at a second speed higher than the first speed (e.g., may encode the image signal of a second frame rate higher than the first frame rate), and transmit the encoded image signals to the application processor 1200. In this case, the second speed may be 30 times or less the first speed.

At least one of the plurality of camera modules 1100a, 1100b, or 1100c may be used to implement a scanning zoom function of the inventive concepts. In some example embodiments, one camera module including an ultra-high-resolution image sensor having a relatively wide field of view may be selected to implement embodiments of the inventive concepts. In some example embodiments, two camera modules, which respectively include image sensors having the same field of view and providing different resolutions, may be selected to implement embodiments of the inventive concepts. In some example embodiments, two camera modules, which respectively include image sensors having different FOVs from each other and providing the same resolution, may be selected to implement embodiments of the inventive concepts.

The application processor 1200 may store the received image signals, that is, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one among the sub image processors 1212a, 1212b, and 1212c of the image processing device 1210 may perform decoding and may also perform image processing on the decoded image signal.

In the second operating mode, the plurality of camera modules 1100a, 1100b, and 1100c may generate image signals at a third speed lower than the first speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100a, 1100b, and 1100c, respectively. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the plurality of camera modules 1100a, 1100b, and 1100c and may adjust a level of the power. The power control signal PCON may include a power adjustment signal for each operating mode of the plurality of camera modules 1100a, 1100b, and 1100c. For example, the operating mode may include a low-power mode. In this case, the power control signal PCON may include information about a camera module operating in the low-power mode and a set power level. Levels of the powers respectively provided to the plurality of camera modules 1100a, 1100b, and 1100c may be identical to each other or may be different from each other. Also, a level of a power may be dynamically changed.

It will be understood that any of the electronic devices as described herein (including without limitation electronic device 10 and electronic device 1000) and/or any portions thereof (including without limitation any blocks, modules, processors, controllers, cameras, or the like of said electronic devices) may include, may be included in, and/or may be implemented by one or more instances of processors such as hardware including logic circuits; a hardware/software combination such as a processor executing software; or a combination thereof. For example, a processor as described herein more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, a processor may include a non-transitory computer readable storage device, for example a solid state drive (SSD), storing a program of instructions, and an instance of processor hardware, for example a CPU, configured to execute the program of instructions to implement the functionality and/or methods performed by some or all of any electronic device according to any of the example embodiments (including without limitation any portion, block, module, controller, processor, camera, or the like of any electronic device according to any of the example embodiments).

Any of the memories described herein, including, without limitation, internal memory 1230, external memory 1400, memory 1146, and/or storage 1150 may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

According to some example embodiments of the inventive concepts, an ultra-high-resolution video stream may be provided to a user in real time within a limited bandwidth by using an image sensor having a multi-crop function.

While the inventive concepts have been described with reference to some example embodiments thereof, it will be apparent to those of ordinary skill in the art that various changes and modifications may be made thereto without departing from the spirit and scope of the inventive concepts as set forth in the following claims.

What is claimed is:
1. An electronic device, comprising:
a first image sensor configured to photograph an object in a first field of view to generate a first signal;
a second image sensor configured to photograph the object in a second field of view to generate a second signal;

an image signal processor configured to
  generate first image data of a current frame based on the first signal, the first image data having a first resolution,
  generate second image data of the current frame based on the second signal, the second image data having a second resolution that is greater than the first resolution, and
  generate cropped image data based on cropping a region of interest from the second image data; and
a main processor configured to
  generate a first video stream based on the first image data,
  generate a second video stream based on the cropped image data, and
  output the first video stream to a display device,
wherein the main processor is further configured to stop outputting the first video stream to the display device and initiate outputting the second video stream to the display device in response to receiving a user input command.

2. The electronic device of claim 1, wherein the main processor is configured to
  detect the region of interest based on first image data which correspond to a previous frame of the current frame and are generated by the first image sensor, and
  calculate values associated with the region of interest.

3. The electronic device of claim 2, wherein the image signal processor includes:
  a camera control interface configured to receive the values associated with the region of interest from the main processor; and
  a register configured to store the received values associated with the region of interest.

4. The electronic device of claim 3, wherein the image signal processor is configured to crop the region of interest from the second image data with reference to the values associated with the region of interest, which are stored in the register.

5. The electronic device of claim 2, wherein the values associated with the region of interest include
  a value indicating whether the region of interest is present in the first image data,
  coordinates of the region of interest on the first image data,
  a length of the region of interest in a first direction, and
  a length of the region of interest in a second direction that is different from the first direction.

6. The electronic device of claim 1, wherein the image signal processor is configured to transmit the first image data and the cropped image data to the main processor through a camera serial interface (CSI).

7. The electronic device of claim 6, wherein the image signal processor is configured to generate the cropped image data based on a bandwidth of the camera serial interface.

8. The electronic device of claim 6, wherein
  the image signal processor includes a camera serial interface (CSI) transmitter and a physical layer configured to transmit the first image data and the cropped image data, and
  the main processor includes a CSI receiver and a separate physical layer configured to receive the first image data and the cropped image data.

9. The electronic device of claim 1, wherein the first field of view and the second field of view are identical.

10. The electronic device of claim 1, wherein
  the first image sensor includes a first pixel array, wherein the first signal generated by the first image sensor is associated with a first image,
  the second image sensor includes a second pixel array, wherein the second signal generated by the second image sensor is associated with a second image, and
  the second pixel array has a higher resolution than a resolution of the first pixel array, such that the second signal generated by the second image sensor is associated with a higher-resolution image than the first signal generated by the first image sensor.

11. An electronic device, comprising:
an image sensor configured to photograph an object in a first field of view to generate a first signal;
an image signal processor configured to
  generate first image data of a current frame based on the first signal,
  generate second image data of the current frame based on performing binning on the first image data, and
  generate cropped image data based on cropping a region of interest from the first image data; and
a main processor configured to
  generate a first video stream based on the second image data,
  generate a second video stream based on the cropped image data, and
  output the first video stream to a display device,
wherein the main processor is configured to stop outputting the first video stream to the display device and initiate outputting the second video stream to the display device in response to receipt of a user input command.

12. The electronic device of claim 11, wherein the main processor is configured to
  detect the region of interest based on second image data which correspond to a previous frame of the current frame and are generated by the image sensor, and
  calculate values associated with the region of interest.

13. The electronic device of claim 12, wherein the image signal processor includes:
  a camera control interface configured to receive the values associated with the region of interest from the main processor; and
  a register configured to store the received values associated with the region of interest.

14. The electronic device of claim 13, wherein the image signal processor is configured to the region of interest from the second image data with reference to the values associated with the region of interest, which are stored in the register.

15. The electronic device of claim 11, wherein
  the image signal processor includes a camera serial interface (CSI) transmitter and a physical layer configured to transmit the first image data and the cropped image data, and
  the main processor includes a CSI receiver and a separate physical layer configured to receive the first image data and the cropped image data.

16. An electronic device, comprising:
a first image sensor configured to photograph an object in a first field of view to generate a first signal;
a second image sensor configured to photograph the object in a second field of view to generate a second signal;

an image signal processor configured to
  generate first image data of a current frame based on the first signal,
  generate second image data of the current frame based on the second signal,
  generate third image data based on performing binning on the first image data,
  generate fourth image data based on performing binning on the second image data,
  generate first cropped image data based on cropping a first region of interest from the first image data, and
  generate second cropped image data based on cropping a second region of interest from the second image data; and
a main processor configured to
  generate a first video stream based on the first image data and the second image data,
  generate a second video stream based on the first cropped image data,
  generate a third video stream based on the second cropped image data, and
  output the first video stream to a display device,
wherein the main processor is configured to stop outputting the first video stream to the display device and initiate outputting one of the second video stream or the third video stream to the display device in response to receiving a user input command.

17. The electronic device of claim 16, wherein a field of view of the first video stream is greater than the first field of view and is greater than the second field of view.

18. The electronic device of claim 16, wherein the main processor is configured to
  detect the first region of interest based on first image data which correspond to a previous frame of the current frame and are generated by the first image sensor, and
  calculate values associated with the first region of interest.

19. The electronic device of claim 18, wherein the image signal processor includes:
  a camera control interface configured to receive the values associated with the first region of interest from the main processor; and
  a register configured to store the received values associated with the first region of interest.

20. The electronic device of claim 16, wherein
  the image signal processor includes a camera serial interface (CSI) transmitter and a physical layer configured to transmit the first image data, the first cropped image data, and the second cropped image data, and
  the main processor includes a CSI receiver and a separate physical layer configured to transmit the first image data, the first cropped image data, and the second cropped image data.

* * * * *